(12) United States Patent
Kelley et al.

(10) Patent No.: US 12,441,045 B2
(45) Date of Patent: *Oct. 14, 2025

(54) CONTAINER AND METHOD OF MANUFACTURE

(71) Applicant: RING CONTAINER TECHNOLOGIES, LLC, Oakland, TN (US)

(72) Inventors: Paul Vincent Kelley, Arlington, TN (US); Michael Green, Somerville, TN (US); Douglas Miles Dygert, Olive Branch, MS (US); Daniel M. Futral, Somerville, TN (US)

(73) Assignee: Ring Container Technologies, LLC, Oakland, TN (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/454,358

(22) Filed: Aug. 23, 2023

(65) Prior Publication Data
US 2023/0390988 A1 Dec. 7, 2023

Related U.S. Application Data

(63) Continuation-in-part of application No. 17/952,530, filed on Sep. 26, 2022, now Pat. No. 12,162,203,
(Continued)

(51) Int. Cl.
*B29C 49/06* (2006.01)
*B29C 49/00* (2006.01)
(Continued)

(52) U.S. Cl.
CPC .......... *B29C 49/06* (2013.01); *B29C 49/0005* (2013.01); *B29C 49/071* (2022.05);
(Continued)

(58) Field of Classification Search
CPC ... B29C 49/071; B29C 49/4273; B29C 49/06; B29C 49/0005; B29C 2949/3034;
(Continued)

(56) References Cited

U.S. PATENT DOCUMENTS

| 3,464,546 A | 9/1969 | Thomka |
| 4,923,723 A | 5/1990 | Collette ............... B65D 1/0215 215/382 |

(Continued)

FOREIGN PATENT DOCUMENTS

| EP | 1504999 A1 | 2/2005 |
| WO | 2017156384 A1 | 9/2017 |

OTHER PUBLICATIONS

The International Bureau of WIPO 34, chemin des Colombettes, 1211 Geneva 20, Switzerland, International Preliminary Report on Patentability, Written Opinion of the International Searching Authority, International application No. PCT/US2020/058800, Date of issuance of this report—May 10, 2022.

*Primary Examiner* — Monica A Huson
(74) *Attorney, Agent, or Firm* — SORELL, LENNA & SCHMIDT, LLP

(57) ABSTRACT

A method for manufacturing a container includes injecting a first material into a first mold to form a top portion of a preform. The first material and a second material are injected into the first mold to form a bottom portion of the preform. The preform is disposed in a second mold. The preform is blow molded into a finished container.

26 Claims, 14 Drawing Sheets

Related U.S. Application Data which is a continuation of application No. 17/088,896, filed on Nov. 4, 2020, now Pat. No. 11,607,833.

(60) Provisional application No. 62/930,220, filed on Nov. 4, 2019.

(51) Int. Cl.
*B29C 49/42* (2006.01)
*B65D 1/02* (2006.01)
*B29K 67/00* (2006.01)
*B29L 31/00* (2006.01)

(52) U.S. Cl.
CPC ........ *B29C 49/4273* (2013.01); *B65D 1/0215* (2013.01); *B65D 1/0276* (2013.01); *B29C 2949/0761* (2022.05); *B29C 2949/08* (2022.05); *B29C 2949/3032* (2022.05); *B29C 2949/3034* (2022.05); *B29K 2067/003* (2013.01); *B29L 2031/7158* (2013.01)

(58) Field of Classification Search
CPC ...... B29C 2049/023; B29C 2949/0761; B29C 2949/3032; B29C 2949/08; B29C 2949/0715; B29C 2949/22; B65D 1/0276; B65D 1/0215; B29L 2031/7158; B29K 2067/003

See application file for complete search history.

(56) References Cited

U.S. PATENT DOCUMENTS

| | | |
|---|---|---|
| 4,994,313 A | 2/1991 | Shimizu et al. |
| 5,077,111 A | 12/1991 | Collette |
| 5,281,360 A | 1/1994 | Hong et al. |
| 5,676,267 A | 10/1997 | Slat et al. |
| 5,759,653 A | 6/1998 | Collette et al. |
| 5,885,481 A | 3/1999 | Venkateshwaran et al. |
| 5,952,066 A | 9/1999 | Schmidt et al. |
| 5,976,653 A | 11/1999 | Collette et al. |
| 6,123,211 A | 9/2000 | Rashid et al. |
| 6,365,247 B1 | 4/2002 | Cahill et al. |
| 6,410,156 B1 | 6/2002 | Akkapeddi et al. |
| 6,517,776 B1 | 2/2003 | Rodgers et al. |
| 6,554,146 B1 | 4/2003 | DeGroff et al. |
| 6,677,013 B1 | 1/2004 | Curie et al. |
| 6,808,820 B2 | 10/2004 | Lee et al. |
| 6,841,211 B1 | 1/2005 | Knoll et al. |
| 6,933,055 B2 | 8/2005 | Share et al. |
| 7,056,565 B1 | 6/2006 | Cai et al. |
| 11,607,833 B2 * | 3/2023 | Kelley ............... B29C 49/0005 |
| 2002/0022099 A1 | 2/2002 | Schmidt et al. |
| 2002/0037377 A1 | 3/2002 | Schmidt et al. |
| 2003/0012896 A1 | 1/2003 | Ching et al. |
| 2004/0074904 A1 | 4/2004 | Share et al. |
| 2005/0181155 A1 | 8/2005 | Share et al. |
| 2006/0019045 A1 | 1/2006 | Bourgeois |
| 2006/0051451 A1 | 3/2006 | Hutchinson et al. |
| 2006/0065992 A1 | 3/2006 | Hutchinson et al. |
| 2006/0073298 A1 | 4/2006 | Hutchinson et al. |
| 2006/0180790 A1 | 8/2006 | Deshpande et al. |
| 2006/0275568 A1 | 12/2006 | Shi et al. |
| 2007/0082156 A1 | 4/2007 | Shi et al. |
| 2008/0044603 A1 | 2/2008 | Hutchinson et al. |
| 2008/0113134 A1 | 5/2008 | Shi et al. |
| 2009/0220717 A1 | 9/2009 | Wilczak et al. |
| 2012/0241406 A1 | 9/2012 | Beuerle et al. |
| 2016/0052694 A1 | 2/2016 | Li et al. |
| 2017/0267436 A1 | 9/2017 | Yamamoto |

* cited by examiner

CONTAINER AND METHOD OF MANUFACTURE

CROSS-REFERENCE TO RELATED APPLICATIONS

This application is a continuation-in-part of U.S. patent application Ser. No. 17/952,528, filed on Sep. 26, 2022, and a continuation-in-part of U.S. patent application Ser. No. 17/952,530, filed on Sep. 26, 2022, which are each a continuation of U.S. patent application Ser. No. 17/088,896, filed on Nov. 4, 2020, which claims the benefit of U.S. Provisional Patent Application No. 62/930,220, filed on Nov. 4, 2019. These applications are hereby incorporated herein by reference, in their entireties.

TECHNICAL FIELD

The present disclosure generally relates to blow-molded containers and more particularly to plastic containers and methods for making the same for food and/or packaging, for example.

BACKGROUND

Plastic blow-molded containers are commonly used for food and/or beverage packaging products. Many food and beverage products are sold to the consuming public in blow-molded containers. These containers can be made from polyethylene terephthalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

Such plastic blow-molded containers may be produced on single stage injection mold equipment. The single stage blow molding process combines the injection molding of the preform and blowing of the container into one machine. This machine has an extruder that melts resin pellets and injects the molten resin into a mold to create the preform. The preform is transferred to a blow station to form the container and the container is removed from the machine. In some cases, the plastic blow-molded containers are produced with two-stage equipment. The two-stage equipment makes preforms in an injection molding machine and then reheats and blows the preforms into selected containers in a separate blowing machine. In particular, a resin is injected into a mold cavity of a mold at high pressure. Components of the mold are moved relative to one another such that the volume of the mold cavity decreases, causing compression, which assists in melting the resin into a molten resin, which forms the preform within the mold.

Some conventional plastic blow-molded containers include additives, such as, for example, oxygen scavengers to improve the shelf life of items that are stored in the containers. However, the additives in conventional plastic blow-molded containers are not concentrated and/or are included in very low concentrations. The unconcentrated additives in conventional plastic blow-molded containers often make up greater than 1.0 wt. % of the container, which greatly increases the cost of container, due to the high cost of the additives. Further, additives used for barrier layers, such as, for example, oxygen scavengers can reduce and/or eliminate the ability to recycle some containers that include such additives due to unwanted yellowing caused by some additives. Moreover, some types of catalysts used in the manufacture of plastic blow-molded containers can cause further unwanted yellowing and thus further reduce and/or eliminate the ability to recycle certain containers. This disclosure describes an improvement over these prior art technologies.

SUMMARY

In one embodiment, in accordance with the principles of the present disclosure, a method for manufacturing a container is provided. The method includes injecting a first material into a first mold to form a top portion of a preform. The first material and a second material are injected into the first mold to form a bottom portion of the preform. The preform is disposed in a second mold. The preform is blow molding into a finished container. In some embodiments, the top portion comprises only one material and the bottom portion comprises a plurality of materials. In some embodiments, the top portion comprises only one material and the bottom portion comprises an inner portion, an intermediate portion and an outer portion. In some embodiments, the top portion, the inner portion and the outer portion are free of the second material. In some embodiments, the first material is polyethylene terephthalate and the second material contains an oxygen scavenger. In some embodiments, a thickness of a wall of the preform is defined by the inner, outer and intermediate portions, the thickness having a midline equidistant between an outer surface of the outer portion and an inner surface of the inner portion, the wall having a first portion extending from the outer surface to the midline and a second portion extending from the inner surface to the midline, the intermediate portion being positioned in the second portion. In some embodiments, a thickness of a wall of the preform is defined by the inner, outer and intermediate portions, the thickness having a midline equidistant between an outer surface of the outer portion and an inner surface of the inner portion, the wall having a first portion extending from the outer surface to the midline and a second portion extending from the inner surface to the midline, the intermediate portion being positioned exclusively in the second portion. In some embodiments, the intermediate portion has a uniform thickness. In some embodiments, the bottom portion is formed after the top portion is formed. In some embodiments, the first material is polyethylene terephthalate and the second material contains an oxygen scavenger, the oxygen scavenger comprising 0.01 wt. % to 0.1 wt. % of the finished container. In some embodiments, the first material is polyethylene terephthalate and the second material contains an oxygen scavenger, the oxygen scavenger comprising 0.01 wt. % to 0.05 wt. % of the finished container. In some embodiments, the first material is polyethylene terephthalate and the second material contains an oxygen scavenger, the oxygen scavenger comprising 0.01 wt. % to 0.04 wt. % of the finished container. In some embodiments, the first material is polyethylene terephthalate and the second material contains an oxygen scavenger, the oxygen scavenger comprising 0.03 wt. % to 0.05 wt. % of the finished container. In some embodiments, the finished container is formed without trimming the preform In one embodiment, in accordance with the principles of the present disclosure, a method for manufacturing a container is provided. The method includes injecting a first material into a first mold to form a top portion of a preform, the top portion comprising only one material. The first material and a second material are injected into the first mold to form a bottom portion of the preform. The bottom portion comprises an inner portion, an intermediate portion and an outer portion. The inner and outer portions comprise the first material. The intermediate portion comprises the second material. The preform is disposed in a second mold. The preform is blow molded into a finished container. None of the intermediate portion extends through the outer portion or the inner portion when the preform is disposed in the second mold. In some embodiments, the preform is formed without a sprue. In some embodiments, the preform does not include a sprue when the preform is disposed in the second mold. In some embodiments, the intermediate portion has a thickness that is less than a thickness of the inner portion and a thickness of the outer portion. In some embodiments, the first material is polyethylene terephthalate and the second material contains an oxygen scavenger, the oxygen scavenger comprising 0.01 wt. % to 0.1 wt. % of the finished container. In some embodiments, the first material is polyethylene terephthalate and the second material contains an oxygen scavenger, the oxygen scavenger comprising 0.01 wt. % to 0.05 wt. % of the finished container. In some embodiments, the first material is polyethylene terephthalate and the second material contains an oxygen scavenger, the oxygen scavenger comprising 0.01 wt. % to 0.04 wt. % of the finished container. In some embodiments, a thickness of a wall of the preform is defined by the inner, outer and intermediate portions, the thickness having a midline equidistant between an outer surface of the outer portion and an inner surface of the inner portion, the wall having a first portion extending from the outer surface to the midline and a second portion extending from the inner surface to the midline, the intermediate portion being positioned exclusively in the second portion. In some embodiments, the intermediate portion is positioned closer to the inner surface than the midline. In some embodiments, the bottom portion comprises opposite first and second sidewalls and a bottom wall extending from the first sidewall to the second sidewall, the sidewalls each including the inner, outer and intermediate portions, the bottom wall comprising only one material. In some embodiments, the finished container is formed without trimming the preform.

In one embodiment, in accordance with the principles of the present disclosure, a method for manufacturing a container is provided. The method includes injecting a first material into a first mold to form a top portion of a preform, wherein the first material comprises polyethylene terephthalate that is made with a metallic catalyst. The method further includes injecting the first material and a second material into the first mold to form a bottom portion of the preform, wherein the second material comprises a resin, a catalyst and an oxygen scavenger. The top portion comprises only the first material and the bottom portion comprises an inner portion, an intermediate portion and an outer portion, the inner portion and the outer portion comprising the first material, the intermediate portion comprising the second material. In some embodiments, the metallic catalyst comprises antimony. In some embodiments, the metallic catalyst comprises antimony trioxide and is present in the first material at a concentration of 150-350 parts per million antimony. In some embodiments, the metallic catalyst comprises antimony trioxide and is present in the first material at a concentration of 250-290 parts per million antimony. In some embodiments, the metallic catalyst comprises antimony triacetate and is present in the first material at a concentration of 150-350 parts per million antimony. In some embodiments, the metallic catalyst comprises antimony triacetate and is present in the first material at a concentration of 250-290 parts per million antimony. In some embodiments, the metallic catalyst comprises germanium. In some embodiments, the metallic catalyst comprises germanium dioxide and is present in the first material at a concentration of 50-150 parts per million germanium. In some embodiments, the metallic catalyst comprises germanium dioxide and is present in the first material at a concentration of 50-85 parts per million germanium. In some embodiments, the metallic catalyst comprises a combination of antimony and germanium. In some embodiments, the metallic catalyst comprises aluminum. In some embodiments, the metallic catalyst comprises aluminum alkoxides. In some embodiments, the metallic catalyst consists of antimony. In some embodiments, the metallic catalyst consists of antimony trioxide and is present in the first material at a concentration of 150-350 parts per million antimony. In some embodiments, the metallic catalyst consists of antimony trioxide and is present in the first material at a concentration of 250-290 parts per million antimony. In some embodiments, the metallic catalyst consists of antimony triacetate and is present in the first material at a concentration of 150-350 parts per million antimony. In some embodiments, the metallic catalyst consists of antimony triacetate and is present in the first material at a concentration of 250-290 parts per million antimony. In some embodiments, the metallic catalyst consists of germanium. In some embodiments, the metallic catalyst consists of germanium dioxide and is present in the first material at a concentration of 50-150 parts per million germanium. In some embodiments, the metallic catalyst consists of germanium dioxide and is present in the first material at a concentration of 50-85 parts per million germanium. In some embodiments, the metallic catalyst consists of a combination of antimony and germanium. In some embodiments, the metallic catalyst consists of aluminum. In some embodiments, the metallic catalyst consists of aluminum alkoxides. In some embodiments, the first material comprises a phosphorous stabilizer at a concentration of 5-30 parts per million phosphorous. In some embodiments, the phosphorous stabilizer is phosphoric acid. In some embodiments, the resin comprises a polyester copolymer resin. In some embodiments, the catalyst comprises a cobalt catalyst. In some embodiments, the oxygen scavenger comprises an oxidizable co-polyester barrier. In some embodiments, the first material consists of a phosphorous stabilizer at a concentration of 5-30 parts per million phosphorous. In some embodiments, the phosphorous stabilizer consists of phosphoric acid. In some embodiments, the resin consists of a polyester copolymer resin. In some embodiments, the catalyst consists of a cobalt catalyst. In some embodiments, the oxygen scavenger consists of an oxidizable co-polyester barrier. In some embodiments, the first material is free of titanium.

In one embodiment, in accordance with the principles of the present disclosure, a method for manufacturing a container is provided. The method includes injecting a first material into a first mold to form a top portion of a preform. The first material comprises a phosphorous stabilizer and polyethylene terephthalate that is made with a metallic catalyst. The metallic catalyst comprises antimony trioxide and is present in the first material at a concentration of 250-290 parts per million antimony. The first material is free of titanium. The first material and a second material are injected into the first mold to form a bottom portion of the preform. The second material comprises a resin, a catalyst and an oxygen scavenger. The resin comprises a polyester copolymer resin. The catalyst comprises a cobalt catalyst. The oxygen scavenger comprises an oxidizable co-polyester barrier. The top portion comprises only the first material and the bottom portion comprises an inner portion, an intermediate portion and an outer portion, the inner portion and the outer portion comprising the first material, the intermediate portion comprising the second material.

In one embodiment, in accordance with the principles of the present disclosure, a method for manufacturing a container is provided. The method includes injecting a first material into a first mold to form a top portion of a preform. The first material comprises a phosphorous stabilizer and polyethylene terephthalate that is made with a metallic catalyst. The metallic catalyst comprises antimony triacetate and is present in the first material at a concentration of 150-350 parts per million antimony. The first material is free of titanium. The first material and a second material are injected into the first mold to form a bottom portion of the preform. The second material comprises a resin, a catalyst and an oxygen scavenger. The resin comprises a polyester copolymer resin. The catalyst comprises a cobalt catalyst. The oxygen scavenger comprises an oxidizable co-polyester barrier. The top portion comprises only the first material and the bottom portion comprises an inner portion, an intermediate portion and an outer portion, the inner portion and the outer portion comprising the first material, the intermediate portion comprising the second material.

In one embodiment, in accordance with the principles of the present disclosure, a method for manufacturing a container is provided. The method includes injecting polyethylene terephthalate into a first mold to form a top portion of a preform. The top portion comprises only one material. Polyethylene terephthalate and an oxygen scavenger are injected into the first mold to form a bottom portion of the preform. The bottom portion comprises an inner portion, an intermediate portion and an outer portion. The inner and outer portions comprises polyethylene terephthalate. The intermediate portion comprises the oxygen scavenger. The intermediate portion has a uniform thickness. The preform is disposed in a second mold. The preform is blow molded to form a finished container without trimming the preform. In some embodiments, the oxygen scavenger comprises 0.01 wt. % to 0.1 wt. % of the finished container. In some embodiments, the oxygen scavenger comprises 0.01 wt. % to 0.05 wt. % of the finished container. In some embodiments, the oxygen scavenger comprises 0.01 wt. % to 0.04 wt. % of the finished container. No portion of the intermediate portion extends through the outer portion or the inner portion when the preform is disposed in the second mold. A thickness of a wall of the preform is defined by the inner, outer and intermediate portions, the thickness having a midline equidistant between an outer surface of the outer portion and an inner surface of the inner portion. The wall has a first portion extending from the outer surface to the midline and a second portion extending from the inner surface to the midline. The intermediate portion is positioned exclusively in the second portion such that the intermediate portion is positioned closer to the inner surface than the midline.

In one embodiment, in accordance with the principles of the present disclosure, a finished container is provided that includes a top portion comprising a first material and a bottom portion comprising an inner portion, an intermediate portion and an outer portion. The inner and outer portions comprise the first material. The intermediate portion comprises a second material. A thickness of a wall of the container is defined by the inner, outer and intermediate portions. The thickness has a midline equidistant between an outer surface of the outer portion and an inner surface of the inner portion. The wall has a first portion extending from the outer surface to the midline and a second portion extending from the inner surface to the midline. The intermediate portion is positioned exclusively in the second portion.

In one embodiment, in accordance with the principles of the present disclosure, a finished container is provided that includes a top portion consisting of polyethylene terephthalate and a bottom portion comprising an inner portion, an intermediate portion and an outer portion. The inner and outer portions comprise polyethylene terephthalate. The intermediate portion comprises an oxygen scavenger. A thickness of a wall of the container is defined by the inner, outer and intermediate portions. The thickness has a midline equidistant between an outer surface of the outer portion and an inner surface of the inner portion. The wall has a first portion extending from the outer surface to the midline and a second portion extending from the inner surface to the midline. The intermediate portion is positioned exclusively in the second portion.

In one embodiment, in accordance with the principles of the present disclosure, a method for manufacturing a container is provided. The method includes injecting a first material into a first mold to form a top portion of a preform. The first material and a second material are injected into the first mold to form a bottom portion of the preform. The preform is disposed in a second mold. The preform is blow molded into an intermediate article. The intermediate article is trimmed to form a finished container. In some embodiments, the top portion comprises only one material and the bottom portion comprises a plurality of portions. In some embodiments, the top portion comprises only one material and the bottom portion comprises an inner portion, an intermediate portion and an outer portion. In some embodiments, the top portion, the inner portion and the outer portion are free of the second material. In some embodiments, the first material is polyethylene terephthalate and the second material is an oxygen scavenger. In some embodiments, a thickness of a wall of the preform is defined by the inner, outer and intermediate portions, the thickness having a midline equidistant between an outer surface of the outer portion and an inner surface of the inner portion, the wall having a first portion extending from the outer surface to the midline and a second portion extending from the inner surface to the midline, the intermediate portion being positioned in the second portion. In some embodiments, a thickness of a wall of the preform is defined by the inner, outer and intermediate portions, the thickness having a midline equidistant between an outer surface of the outer portion and an inner surface of the inner portion, the wall having a first portion extending from the outer surface to the midline and a second portion extending from the inner surface to the midline, the intermediate portion being positioned exclusively in the second portion. In some embodiments, the intermediate portion has a uniform thickness. In some embodiments, the bottom portion is formed after the top portion is formed. In some embodiments, the first material is polyethylene terephthalate and the second material contains an oxygen scavenger, the oxygen scavenger comprising 0.01 wt. % to 0.1 wt. % of the finished container. In some embodiments, the first material is polyethylene terephthalate and the second material contains an oxygen scavenger, the oxygen scavenger comprising 0.01 wt. % to 0.05 wt. % of the finished container. In some embodiments, the first material is polyethylene terephthalate and the second material contains an oxygen scavenger, the oxygen scavenger comprising 0.01 wt. % to 0.04 wt. % of the finished container. In some embodiments, the first material is polyethylene terephthalate and the second material contains an oxygen scavenger, the oxygen scavenger comprising 0.03 wt. % to 0.05 wt. % of the finished container.

In one embodiment, in accordance with the principles of the present disclosure, a method for manufacturing a container is provided. The method includes injecting a first material into a first mold to form a top portion of a preform. The top portion comprises only one material. The first material and a second material are injected into the first mold to form a bottom portion of the preform. The bottom portion comprises an inner portion, an intermediate portion and an outer portion. The inner and outer portions comprise the first material. The intermediate portion comprises the second material. The preform is disposed in a second mold. The preform is blow molded into an intermediate article. The intermediate article is trimmed to form a finished container. No portion of the intermediate portion extends through the outer portion or the inner portion when the preform is disposed in the second mold. In some embodiments, the preform is formed without a sprue. In some embodiments, the preform does not include a sprue when the preform is disposed in the second mold. In some embodiments, the intermediate portion has a thickness that is less than a thickness of the inner portion and a thickness of the outer portion. In some embodiments, the first material is polyethylene terephthalate and the second material contains an oxygen scavenger, the oxygen scavenger comprising 0.01 wt. % to 0.1 wt. % of the finished container. In some embodiments, the first material is polyethylene terephthalate and the second material contains an oxygen scavenger, the oxygen scavenger comprising 0.01 wt. % to 0.05 wt. % of the finished container. In some embodiments, the first material is polyethylene terephthalate and the second material contains an oxygen scavenger, the oxygen scavenger comprising 0.01 wt. % to 0.04 wt. % of the finished container. In some embodiments, a thickness of a wall of the preform is defined by the inner, outer and intermediate portions, the thickness having a midline equidistant between an outer surface of the outer portion and an inner surface of the inner portion, the wall having a first portion extending from the outer surface to the midline and a second portion extending from the inner surface to the midline, the intermediate portion being positioned exclusively in the second portion. In some embodiments, the intermediate portion is positioned closer to the inner surface than the midline. In some embodiments, the bottom portion comprises opposite first and second sidewalls and a bottom wall extending from the first sidewall to the second sidewall, the sidewalls each including the inner, outer and intermediate portions, the bottom wall comprising only one portion.

In one embodiment, in accordance with the principles of the present disclosure, a method for manufacturing a container is provided. The method includes injecting polyethylene terephthalate (PET) into a first mold to form a top portion of a preform. The top portion comprises only one material. PET and an oxygen scavenger are injected into the first mold to form a bottom portion of the preform. The bottom portion comprises an inner portion, an intermediate portion and an outer portion. The inner and outer portions comprise PET. The intermediate portion comprises the oxygen scavenger. The intermediate portion can have a uniform thickness or a non-uniform thickness. The preform is disposed in a second mold. The preform is blow molded into an intermediate article. The intermediate article is trimmed to form a finished container. No portion of the intermediate portion extends through the outer portion or the inner portion when the preform is disposed in the second mold. A thickness of a wall of the preform is defined by the inner, outer and intermediate portions. The thickness has a midline equidistant between an outer surface of the outer portion and an inner surface of the inner portion. The wall has a first portion extending from the outer surface to the midline and a second portion extending from the inner surface to the midline. The intermediate portion is positioned exclusively in the second portion such that the intermediate portion is positioned closer to the inner surface than the midline.

BRIEF DESCRIPTION OF THE DRAWINGS

The present disclosure will become more readily apparent from the specific description accompanied by the following drawings, in which.

DETAILED DESCRIPTION

Figure 1:
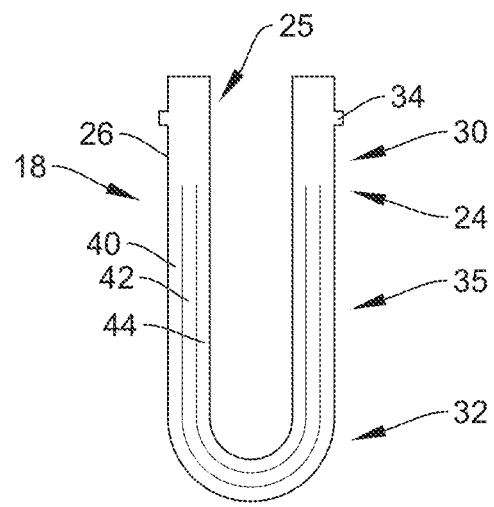
FIG. 1 is a side, cross-sectional view of a component of one embodiment of a container system in accordance with the principles of the present disclosure.

The exemplary embodiments of blow-molded containers and more particularly, plastic containers and methods for making the same are discussed in terms of food packaging products. In some embodiments, the present container is manufactured via an injection molded preform, which is subjected to a blow mold and trim process. In some embodiments, the present container can be filled with food, food preparation oils, viscous and/or beverage products. In some embodiments, the present container can be employed as a cold fill container. In some embodiments, the present container can be employed as a hot fill container. In some embodiments, the present container is employed as a light weight, high strength and barrier food packaging product.

Barrier materials for plastic bottles, such as, for example, PET bottles are priced much higher than the base price for PET. Conventional PET bottles typically include barrier material that makes up 3.0 wt. % to 5.0 wt. % of the PET bottle. To reduce cost, the PET bottles of the present disclosure include much less of the barrier material (e.g., less than 1.0 wt. %) without compromising the shelf life of an unfilled bottle or the shelf life of a product that fills the bottle, as discussed herein. Indeed, it has been found that by selectively positioning a barrier material in a wall thickness of a container such that the barrier material is biased toward a center line of the container and/or concentrating the barrier material such that the barrier material comprises less than 0.1 wt. % of the container results in a container that has an unfilled shelf life or a product shelf life that is greater than an unfilled shelf life or a product shelf life of a container having a barrier material that is not biased toward a center line of the container and/or having unconcentrated barrier material such that the barrier material comprises more than 0.1 wt. % of the container. As such, by selectively positioning a barrier material in a wall thickness of a container such that the barrier material is biased toward a center line of the container and/or concentrating the barrier material such that the barrier material comprises less than 0.1 wt. % of the container, less of the barrier material can be used, while still having the same or greater unfilled and filled shelf life. For example, in some embodiments, the bottles of the present disclosure include between 0.01 wt. % and 0.1% of the barrier material. In some embodiments, the bottles of the present disclosure include between 0.01 wt. % and 0.05% of the barrier material. In some embodiments, the bottles of the present disclosure include between 0.01 wt. % and 0.04% of the barrier material. In some embodiments, the bottles of the present disclosure include between 0.03 wt. % and 0.05% of the barrier material.

In some embodiments, the bottles of the present disclosure are manufactured using an injection molding machine with a material hot runner and injection process that can inject 2 or more materials from 2 or more extruders. Polyethene terephthalate copolymer resin ranging from an IV of 0.72 up to 1.0 for injection stretch blow molding is used to form a top section of a preform and inner and outer portions of a bottom section of the preform, as discussed herein. It has been found that these resins do not impact the overall barrier performance of the finished container. In some embodiments, the material that forms the top section of the preform and the inner and outer portions of the bottom section of the preform includes a metallic catalyst, such as, for example, antimony, antimony trioxide, antimony triacetate, germanium, germanium, aluminum and/or aluminum alkoxides in addition to the polyethene terephthalate copolymer resin. In some embodiments, the material that forms the top section of the preform and the inner and outer portions of the bottom section of the preform includes a stabilizer, such as, for example a phosphorous stabilizer such as phosphoric acid in addition to the polyethene terephthalate copolymer resin and the metallic catalyst. An intermediate portion or barrier material of the preform comprises Polyethene terephthalate copolymer resins with a cobalt catalyst an oxidizable co-polyester active barrier component. In some embodiments, the intermediate between 0.01 wt. % and 0.1% of the finished container, between 0.01 wt. % and 0.05% of the finished container, between 0.01 wt. % and 0.04% of the finished container, or between 0.03 wt. % and 0.05% of the finished container. The preform is blow molded on a two stage platform. In some embodiments, the finished container comprises 90% Polyethene terephthalate copolymer commodity PET resin and the barrier portion of the finished container comprises 10 wt. % comprised of 96% Polyethene terephthalate copolymer resins with a cobalt catalyst and 4% of oxidizable co-polyester active barrier.

In some embodiments, the preform of the present disclosure has a concentrated barrier region 0.94 mm (0.036 in.) to 1.27 mm (0.050 in.). In some embodiments, the concentrated barrier region is positioned towards a central axis from 10%-30% from an inner wall of the preform. In some embodiments, the concentrated barrier region contains 0.1%-1.0% barrier additive and is 0.01%-0.1% total weight percentage. In some embodiments, the concentrated barrier region contains 0.1%-0.5% barrier additive and is 0.01%-0.05% total weight percentage. In some embodiments, the concentrated barrier region contains 0.1%-0.4% barrier additive and is 0.01%-0.04% total weight percentage. In some embodiments, the concentrated barrier region contains 0.3%-0.5% additive and is 0.03%-0.05% total weight percentage. In some embodiments, the concentrated barrier region is below the threaded neck finish area of the preform. That is, the threaded neck finish area is spaced apart from the concentrated barrier region such that the concentrated barrier region does not extend into the threaded neck finish area.

In some embodiments, the finished container of the present disclosure has an overall wall thickness of 0.45 mm (0.018 in.). In some embodiments, the finished container of the present disclosure has a concentrated barrier region with a thickness between 0.15 mm (0.006 in.) and 0.04 mm (0.002 in.). The barrier region of the finished container of the present disclosure is concentrated such that a thickness of the barrier region of the finished container of the present disclosure will contain more of the barrier material than the same thickness of a container wherein the barrier region is not concentrated. In some embodiments, the barrier region of the finished container of the present disclosure is concentrated such that a thickness of the barrier region of the finished container of the present disclosure has a density that is greater than the same thickness of a container wherein the barrier region is not concentrated. It is envisioned that the increased density of the barrier region of the finished container of the present disclosure will allow active barrier materials (e.g., active oxygen scavengers) to also act as passive barrier materials (e.g., passive oxygen scavengers). That is, due to the increased density of the barrier region, caused by the concentrated barrier materials, oxygen is unable to physically move through the barrier region of the finished container of the present disclosure. This is not possible where the barrier material is not concentrated. That is, when the barrier material is not concentrated, oxygen is permitted to move through/across the barrier region. In some embodiments, the concentrated barrier region is positioned towards central axis from 10%-30% from inner wall. In some embodiments, the concentrated barrier region contains 0.5%-5.0% additive and is 0.1%-1.0% total weight percentage. In some embodiments, the concentrated barrier region contains 1.0%-4.0% additive and is 0.05%-0.5% total weight percentage. In some embodiments, the concentrated barrier region contains 1%-4% additive and is 0.01%-0.04% total weight percentage. In some embodiments, the concentrated barrier region contains 3.0%-5.0% additive and is 0.03%-0.05% total weight percentage. In some embodiments, the concentrated barrier region is below the threaded neck finish area of the preform. That is, the concentrated barrier region does not extend into the threaded neck finish area.

In some embodiments, the present disclosure includes a container system that is employed with a method for manufacturing food packaging having the ability to produce food packages in a manner that minimizes the cost of scrap material and/or allows the scrap material to be reused in other applications, such as, for example, the manufacturing of other containers that may be used for food packaging, for example, as described herein.

In some embodiments, the present disclosure includes a method of producing a container wherein a barrier material is located in a discrete region of a first portion of a preform that is used to make the container, while the discrete region of barrier material is not present in a second portion of the preform. The barrier material may be concentrated or unconcentrated. The method of the present disclosure allows the discrete region of barrier material or barrier layer to be selectively positioned within a thickness of a wall of the container. In some embodiments, the discrete region/barrier layer may include other materials in addition to the barrier material, such as, for example, PET. In some embodiments, the second portion of the preform forms dome or moil scrap that is trimmed from the first portion. In some embodiments, the first portion forms a majority the finished container, while the second portion forms only a small percentage of the finished container. In some embodiments, a majority of the second portion is trimmed from the first portion so that most of the second portion may be used as scrap. In some embodiments, the entire second portion is trimmed from the first portion such that the entire second portion may be used as scrap. In some embodiments, the scrap is used to make other containers. That is, since the second portion does not include any additives, for example, the section of the second portion that is trimmed off remains suitable for use in making additional containers. Indeed, providing scrap material that is free of additives allows for full utilization of the scrap material and avoids processing issues associated with reprocessing scrap material that normally would contain additives and barrier materials.

In some embodiments, the present disclosure includes a method of producing a container wherein scrap material produced in manufacturing the container is free of material additives, such as, for example, passive oxygen scavengers, active oxygen scavengers, colorants, calcium carbonate fillers and foaming agents. In some embodiments, the additives include one or more catalyst. These additives serve particular functions in a PET bottle or container. In some embodiments, the scrap material produced in manufacturing the container is a dome or moil scrap that is trimmed from an intermediate article used to form the finished container. In blow and trim applications where a portion of the blown container is removed from the final bottles (dome, moil, etc.) it is desirable to not have these additives in the portion that is being removed. There are numerous reasons for not having these additives in the removed portion of the bottle, such as, for example, cost savings and reprocessing issues. Indeed, many of these additives are expensive and it is desirable not to add extra cost into sections of the bottle that will not be used in the marketplace. Moreover, these additives can cause considerable reuse issues in the grinding, drying and extrusion processes of the dome and moil. Processors want to be able to reintroduce this scrap material back into their processes so as not to lose the cost of the PET. In some embodiments, these additives can cause clarity issues, yellowing, varying color percentages and activation of the active oxygen scavengers when reintroduced in the process along with virgin PET.

As would be apparent to one of ordinary skill in the art, the yellowing caused by overuse of certain oxygen scavengers often causes containers with such oxygen scavengers to be unsuitable for recycling purposes. This effect is compounded when titanium is used as a catalyst in the formation of polyethylene terephthalate from ethylene glycol and dimethyl terephthalate and/or terephthalic acid. Indeed, use of a titanium catalyst in polyethylene terephthalate making results in the formation of titanium vinylates, which results in the yellowing of PET. This combined with the oxygen barrier additive add to increased yellowing during recycling of the PET. As would also be appreciated by one of ordinary skill in the art, PET bottle recycling is more practical than many other plastic applications because of the high value of the resin and the almost exclusive use of PET for widely used water and carbonated soft drink bottling. Some of the prime uses for recycled PET include polyester fiber, strapping, and non-food containers. Barrier layers, coatings, and other additives are often important additions to PET bottles to enhance the properties of PET. Unlike closures or labels, these additions cannot be visually determined to be problematic or potentially problematic for recycling. Additives such as oxygen barriers that have been blended into the virgin PET can affect the quality of the recycled resin. These additives cannot be removed by the removed by the reclaimers to the degree required to generate a marketable product and therefor is a need for improved recycled oxygen barrier PET bottles. This disclosure provides a container that includes the lower weight percentage and the use of a specific catalyzed PET resin such as an antimony catalyzed PET, as discussed herein.

In blow and trim applications, the presence of additives in the preform can also cause delamination issues at the trim point on the bottle. In some embodiments, the present disclosure avoids this by stopping the additive material short of the trim point, which allows for a section of the blown bottle (primarily in the neck finish and/or other portions) not to have the additive present. That is, the additive portion of the preform that includes the additives terminates below the trim point and a material that does not contain any additives extends from the portion through the trim point, and at least in some cases, beyond the trim point. In the event that the trim point is not a discrete line, a metal or plastic cover (e.g., a lid) that overlaps the thread portion would act as a physical oxygen block and little to no loss in oxygen blocking would occur in this region. That is, the need for additives adjacent to the trim point is reduced or eliminated by the cover/lid that overlaps the thread portion such that the lid covers the thread portion.

In some embodiments, the present disclosure involves a two phase injection system. In a one phase of the two phase injection system, PET or virgin PET is injected into a preform. In some embodiments, PET, a metal catalyst and a phosphorous stabilizer are injected into the preform, rather than PET or virgin PET. It is envisioned that post-industrial material or post-consumer material may be used in this phase. That is, whether PET or virgin PET, or PET, a metal catalyst and a phosphorous stabilizer are used, the PET may be obtained from post-industrial material or post-consumer material, such as, for example, recycled PET containers. In some embodiments, post-industrial material refers to material, such as, for example, PET that is obtained as scrap from an industrial manufacturing process, such as, for example, an industrial manufacturing process for a PET container. In some embodiments, post-consumer material refers to material that has been filled with a substance and wherein a consumer has subsequently removed the substance from the container, leaving only the material that forms the container. That is, post-consumer material is material recycled by the consumer for reuse in another application. In another phase of the two phase injection system, the preform comprises multiple regions, at least one of the multiple regions including an additive. That is, PET or virgin PET and one or more selected additives are injected into the preform in a second injection phase to form the multiple regions. In some embodiments, the phase in which the multiple regions are formed includes injecting one or more polyethene terephthalate copolymer resins with a cobalt catalyst and an oxidizable co-polyester active oxygen scavenger. In some embodiments, the phase in which the multiple regions are produced begins after the first phase is completed. This allows a dome or moil section of the blown bottle that is trimmed from a finished container and is ultimately ground, blended, dried and added to the virgin PET melt stream to be free of additives which will prevent the problems discussed above when scrap with additives is reused. In some embodiments, the term "virgin PET" refers to a material that consists solely of PET. That is, virgin PET does not include any additives, such as, for example, the additives discussed above.

It is envisioned that the present disclosure may be useful for manufacturers that run multiple sizes of blow and trim bottles for various end uses. For example, the present disclosure may be useful to produce containers for food items, such as, for example, dressings, sauces and peanuts, wherein oxygen permeation through the side walls of the container negatively affect shelf life and/or product flavor. It is envisioned that the present disclosure may be useful to produce containers for food items, such as, for example, non-dairy coffee creamers that require color pigment for both fill-line concealment and product protection against UV light penetration. Other containers that can be made from the disclosed process include containers for mayonnaise, salad dressings, peanuts as well as other condiments and/or food products.

In some instances, the dome or moil section of the blown container constitutes 15%-40% of the total injected preform weight. This material must be ground and reprocessed back into the system for economic considerations. Due to the high percentage of scrap material in the blown containers, it is desirable to produce scrap material that is free of any additives, such as, for example, the additives discussed above, to avoid wasting expensive additives and/or avoid complications or costs involved in processing scrap material that includes additives relative to scrap material that does not include additives.

In some embodiments, the present manufacturing method includes the steps of employing a single stage blow molding process. In some embodiments, the method includes injection molding the preform using a two phase injection system, wherein one phase of the two phase injection system (e.g., a first phase) comprises injecting material into the preform and another phase of the two phase injection system (e.g., a second phase) comprises injecting material into the preform to form multiple regions, at least one of which includes an additive, wherein the additive can be concentrated or unconcentrated.

In some embodiments, the material used in the first phase includes PET without any additives. In some embodiments, the material used in the first phase includes PET with one or more additives, such as, for example, one or more metal catalyst and/or one or more stabilizer. In some embodiments, the first material can include at least one additive selected from the group consisting of a UV inhibitor, a demolding aid, and combinations thereof, wherein the additive(s) can be concentrated or unconcentrated. In some embodiments, the metal catalyst can include antimony, antimony trioxide, antimony triacetate, germanium, germanium dioxide, aluminum and/or aluminum alkoxide compounds. In some embodiments, the stabilizer can include a phosphorous stabilizer, such as, for example phosphoric acid. In some embodiments, the material used in the first phase does not include any oxygen scavengers. In some embodiments, the material used in the second phase includes PET and one or more additives, such as, for example, one or more oxygen scavengers. Providing the material that is used in the first phase without any oxygen scavengers and including any oxygen scavengers in the material that is used in the second phase allows the material that is used in the first phase to be reground and to avoid regrinding issues discussed above. In some embodiments, the material used in the second phase includes PET, one or more oxygen scavengers and one or more additional additives, such as, for example, a catalyst. In some embodiments, the catalyst is a cobalt catalyst.

In some embodiments, the method includes the step of testing the one or more preforms to ensure the one or more preforms include a selected weight and selected neck finish dimension. In some embodiments, the method includes the step of employing the one or more preforms with a multiple cavity production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container. In some embodiments, the method includes reusing the dome (and/or other post-industrial material) to produce other containers, such as, for example other wide mouth containers. In some embodiments, reusing the dome (and/or other post-industrial material) includes grinding, blending, drying and adding the dome (and/or other post-industrial material) and adding the ground, blended and dried material to a melt stream, wherein the dome (and/or other post-industrial material) does not contain additives.

In some embodiments, the present container is manufactured to include an oxygen scavenger and/or oxygen barrier material, wherein the oxygen scavenger and/or oxygen barrier material is concentrated or unconcentrated. That is, at least a portion of the container that is not removed during the manufacturing process includes an oxygen scavenger and/or oxygen barrier material such that the oxygen scavenger and/or oxygen barrier material is present in the finished container. In some embodiments, the container comprises one or more regions having an oxygen barrier material, wherein the oxygen barrier material is concentrated or unconcentrated. In some embodiments, the oxygen barrier material is present in the container in an amount less than about 1.0 wt. % of the container. In some embodiments, the oxygen barrier material comprises between about 0.01 wt. % of the container and 0.1 wt. % of the container. In some embodiments, the oxygen barrier material comprises between about 0.01 wt. % of the container and 0.05 wt. % of the container. In some embodiments, the oxygen barrier material comprises between about 0.01 wt. % of the container and 0.04 wt. % of the container. In some embodiments, the oxygen barrier is a passive barrier and is unreactive with oxygen. In some embodiments, the oxygen barrier is an oxygen scavenger and is reactive with oxygen to capture the oxygen. In some embodiments, the oxygen barrier is an oxygen scavenger that is reactive with oxygen to capture the oxygen and may also act as a passive oxygen scavenger due to the concentration of the oxygen barrier. For example, active oxygen scavengers, when concentrated, may provide a physical barrier that prevents oxygen to move through the barrier. Thus is due, at least in part, to the increased density of the oxygen barrier caused by concentrating the material that forms the oxygen barrier (e.g., the oxygen scavenger). In some embodiments, the oxygen scavenger includes one or more oxygen barrier, such as, for example, one or more polymers, metals, compatibilizers, catalysts, and/or fatty acid salts. In some embodiments, the oxygen scavenger includes an oxidizable co-polyester active barrier.

In some embodiments, the present manufacturing method provides PET enhancements via improved material orientation with selective physical performance features, such as, for example, improved top load performance, improved vacuum resistance performance and/or hoop strength, improved $O_2$ performance, improved moisture vapor transmission rate (MVTR) performance. In some embodiments, the enhancements include modifications to the manufacturing process or the addition of additives to provide a container made of PET that has a selected crystallinity, as discussed herein.

In some embodiments, the method is configured to produce a container that has a crystallinity of about 10%. In some embodiments, the method is configured to produce a container that has a crystallinity between about 15% and about 20%. In some embodiments, the preform is heated and stretched to produce a container having a crystallinity between about 18% and about 30%. In some embodiments, the preform is heated and stretched to produce a container having a crystallinity between about 20% and about 40%. In some embodiments, the preform includes a molecular weight between about 120,000 g/mol and about 240,000 g/mol. In some embodiments, the preform includes a molecular weight between about 250,000 g/mol and about 450,000 g/mol. In some embodiments, the preform comprises PET and has an axial stretch ratio of about 1.8 to 1 to about 2.4 to 1.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a container system for producing food packaging products, a container, related components and methods of manufacturing a container with an injection molded preform. Alternate embodiments are also disclosed. Reference is made in detail to the exemplary embodiments of the present disclosure, which are illustrated in the accompanying figures. Turning to FIGS. 1-14, there are illustrated components of a container system, methods of manufacturing a container and graphics related to the same.

Figure 3:
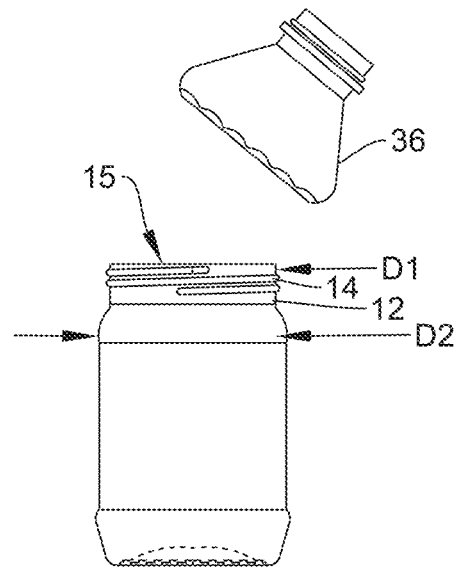
FIG. 3 is a side view of a component of one embodiment of a container system in accordance with the principles of the present disclosure.

A finished blow-molded container 10, as shown in FIG. 3, is constructed for use with a selected application, as described herein. In some embodiments, finished container 10 is a wide-mouth container. In some embodiments, finished container 10 comprises a narrow neck. In some embodiments, finished container 10 is a ketchup bottle. In some embodiments, the selected application includes food, food preparation oils, viscous and/or beverage products. It is envisioned that finished container 10 may include any size and shape and may be filled with any type of food and/or beverage. In some embodiments, finished container 10 is configured for use for applications that do not include foods and/or beverages.

In some embodiments, container 10 comprises a cylindrical threaded neck 12 wherein an outer diameter has a continuous thread 14. Neck 12 defines an opening 15 that is in communication with a cavity of container 10. In some embodiments, neck 12 has a diameter D1 that is between 5% and 25% less than a maximum diameter D2 of container 10. In some embodiments, D1 is between 5% and 20% less diameter D2. In some embodiments, D1 is between 5% and 15% less diameter D2. In some embodiments, D1 is between 5% and 10% less diameter D2.

Figure 2:
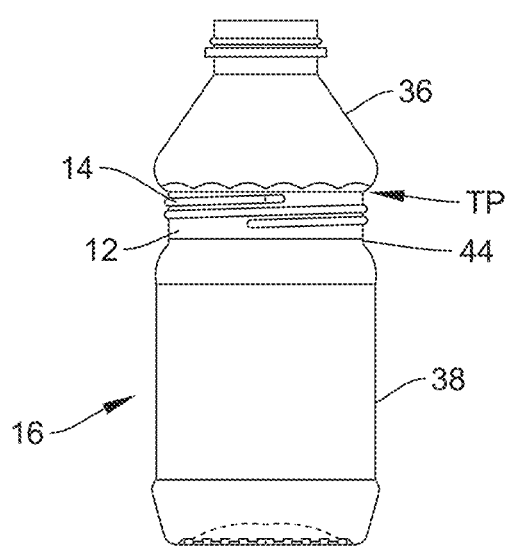
FIG. 2 is a side view of a component of one embodiment of a container system in accordance with the principles of the present disclosure.

In some embodiments, container 10 is manufactured via a two-stage method, as described herein. In some embodiments, container 10 is manufactured via a single stage method, as described herein. In some embodiments, container 10 is produced as a lower part of an intermediate article 16, as shown in FIG. 2. In some embodiments, container 10 is formed by injection molding a preform 18 and then placing preform 18 into a cavity of a mold assembly, to be blown into finished container 10 without any trimming involved, as described herein. That is there is no intermediate article that is trimmed to form the finished container. Rather, finished container 10, including the neck and/or threaded portion are formed by blow molding preform 18 into finished container 10 without the need to trim any part of preform 18 or finished container 10.

Figure 4:
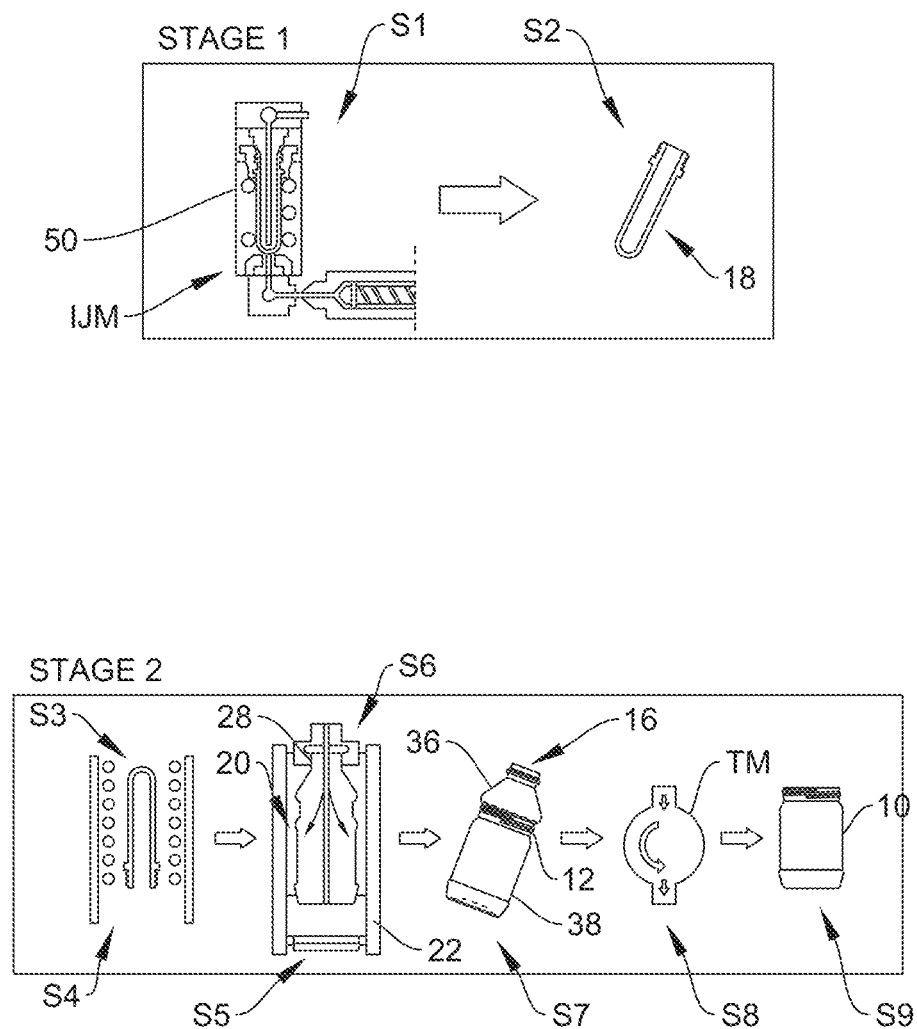
FIG. 4 is a schematic view of a method of manufacturing a container in accordance with the principles of the present disclosure.

In some embodiments, container 10 is manufactured via a two-stage method, as shown in FIG. 4. In some embodiments, an initial step S1 includes injection molding preform 18 in an injection molding machine IJM during a first stage of the manufacturing operation. Preform 18 has a thread forming surface 24 below a preform neck 26. In some embodiments, preform 18 has thread forming surface 24, which includes a portion of preform 18 below neck 26 that will press against mold assembly 22 to form neck 12 and thread 14. In some embodiments, container 10 may be manufactured with a snap fit portion, spiral threads and/or a beaded rim in place of or in addition to thread forming surface 24. In some embodiments, preform 18 can be injection molded with a neck diameter smaller than the neck diameter of container 10, such that a diameter of an opening 28 at a top of mold assembly 22 is substantially reduced. As such, a plurality of mold cavities may be placed in mold assembly 22 of a blow machine of the two-stage equipment to provide improved production capacity. In some embodiments, container 10 may be manufactured with a hoop stretch ratio in a range of about 1.6 to 1 to about 2.0 to 1. In some embodiments, a step S2 includes removing preform 18 from machine IJM.

In some embodiments, injection molding preform 18 comprises injection molding preform 18 using a two phase injection system, wherein a first phase of the two phase injection system comprises injecting a first material 60, such as for example, PET or virgin PET, into a mold 50 of injection molding machine IJM to form a top portion 25 of preform 18 such that top portion 25 includes only one portion that is made solely from first material 60. It is envisioned that first material 60 may be post-industrial material and/or post-consumer material, such as, for example post-industrial PET and/or post-consumer PET. In some embodiments, first material 60 comprises PET a metal catalyst and a stabilizer. In some embodiments, the metal catalyst is selected from the group consisting of antimony, antimony trioxide, antimony triacetate, germanium, germanium, aluminum and aluminum alkoxide compounds. In some embodiments, the stabilizer includes a phosphorous stabilizer such as phosphoric acid. A second phase of the two phase injection system comprises injecting first material 60 and a second material 62, such as, for example, a barrier material or additive into mold 50 to form a bottom portion 35 of preform 18 such that bottom portion 35 includes an outer portion 40 made of first material 60, an intermediate portion 42 made of second material 62 and an inner portion 44 made of first material 60. In some embodiments, top portion 25 is formed before bottom portion 35 is formed. That is, bottom portion 35 is not formed until after top portion 25 is formed. In some embodiments, second material 62 includes a resin, a catalyst and an oxygen scavenger. In some embodiments, the resin comprises a polyester copolymer resin. In some embodiments, the catalyst comprises a cobalt catalyst. In some embodiments, the oxygen scavenger comprises an oxidizable co-polyester barrier. In some embodiments, second material 62 comprises catalytic oxygen scavengers, such as, for example, bor-hydride. In some embodiments, second material 62 is concentrated.

Figure 11:
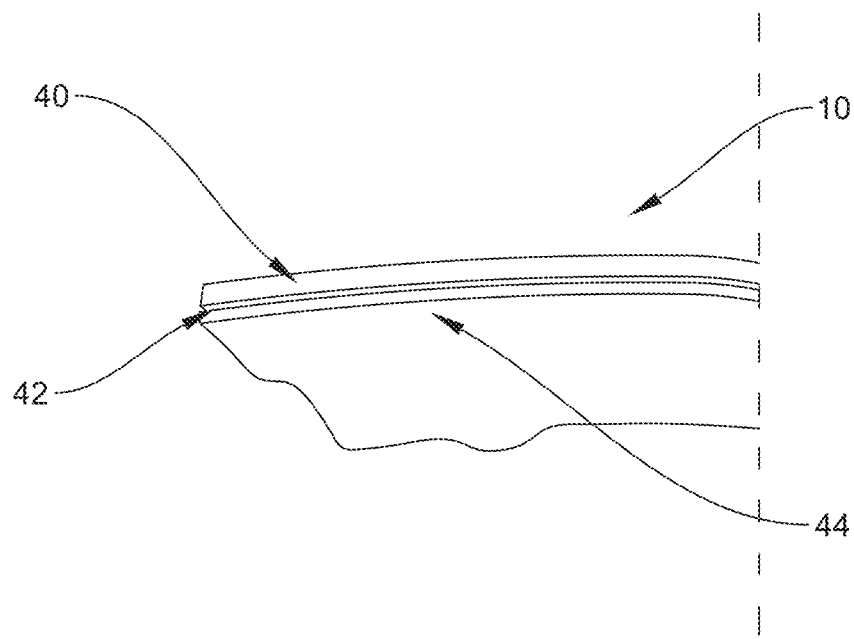
FIG. 11 is a side, cross-sectional view of a component of one embodiment of a container system in accordance with the principles of the present disclosure.

The concentration discussed above refers to the concentration of active scavenger in a specific area of the preform, intermediate article and/or finished container. As an example, as shown in FIG. 11, portions 40 and 44 are both polyester comprising 90% of the total container weight. Portions 40 and 44 are both free of additives that are active oxygen scavengers. There may or may not be additional additives for aesthetic purposes or container performance improvements. Portion 42 comprises 10% of the total container weight. Within this ribbon of material the active scavenger is dispersed. Concentrating it within portion 42 the active scavenger is in a smaller area than if they were dispersed into the total of portions 40, 42 and 44.

In some embodiments, first material 60 includes polyethylene terephthalate that is made with an antimony catalyst and a stabilizer. In some embodiments, first material 60 includes polyethylene terephthalate that is made with an antimony trioxide catalyst and a stabilizer, wherein the concentration of the catalyst in first material 60 is 150-350 parts per million antimony or 250-290 parts per million antimony. In some embodiments, first material 60 includes polyethylene terephthalate that is made with an antimony triacetate catalyst and a stabilizer wherein the concentration of the catalyst in first material 60 is 150-350 parts per million antimony or 250-290 parts per million antimony. In some embodiments, first material 60 includes polyethylene terephthalate that is made with a germanium catalyst and a stabilizer. In some embodiments, first material 60 includes polyethylene terephthalate that is made with a germanium dioxide catalyst and a stabilizer wherein the concentration of the catalyst in first material 60 is 50-150 parts per million germanium or 50-85 parts per million germanium. In some embodiments, first material 60 includes polyethylene terephthalate that is made with an aluminum catalyst. In some embodiments, first material 60 includes polyethylene terephthalate that is made with an aluminum alkoxide catalyst. In some embodiments, the stabilizers discussed in this paragraph include a phosphorous stabilizer and have a concentration of 5-30 parts per million phosphorous of first material 60. In some embodiments, the phosphorous stabilizer is phosphoric acid.

Figure 4A:
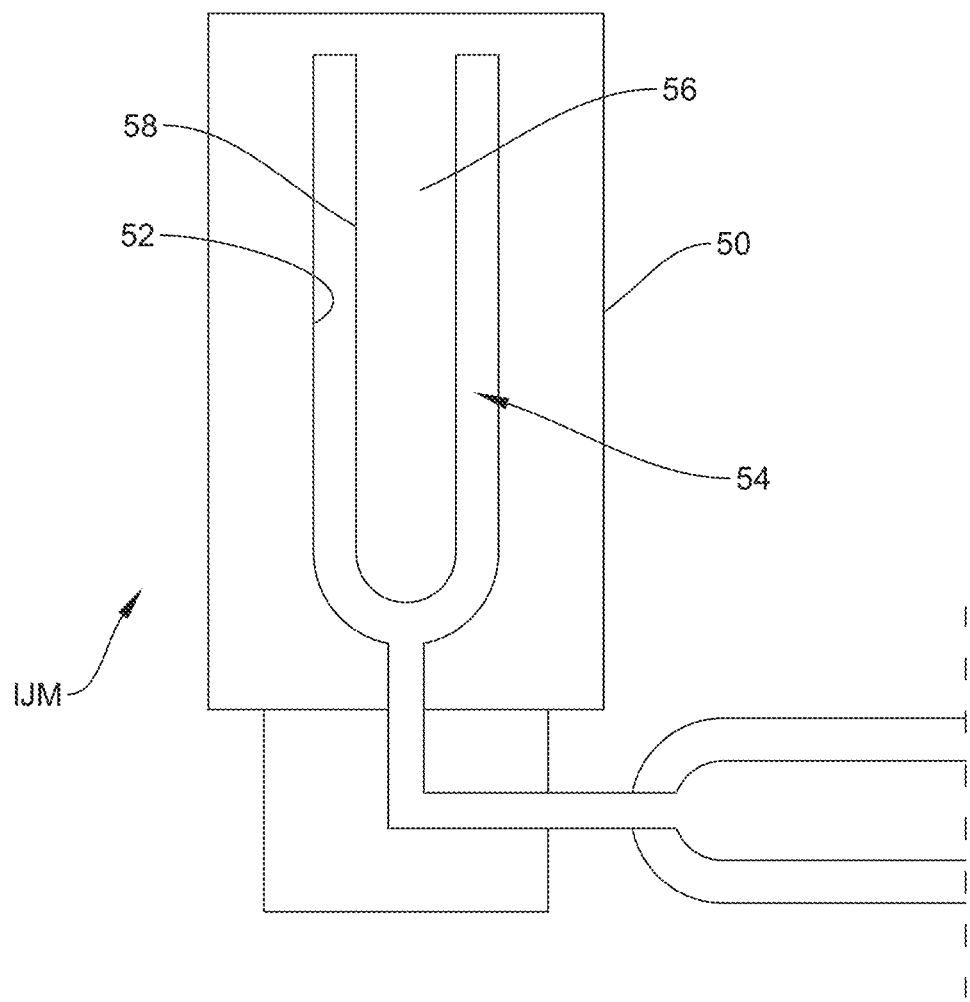
FIG. 4A is a side, cross-sectional view of a component of one embodiment of a container system in accordance with the principles of the present disclosure.
Figure 4B:
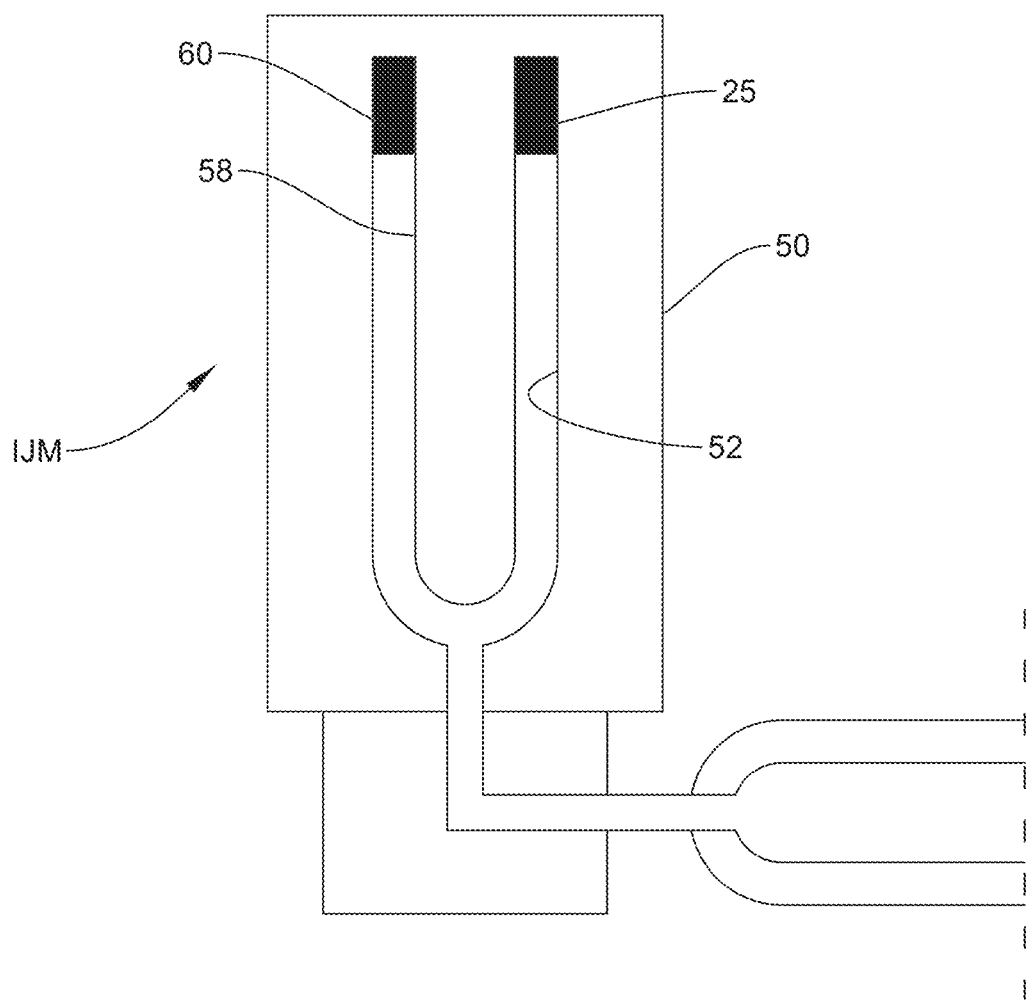
FIG. 4B is a side, cross-sectional view of the component shown in FIG. 4A.
Figure 4C:
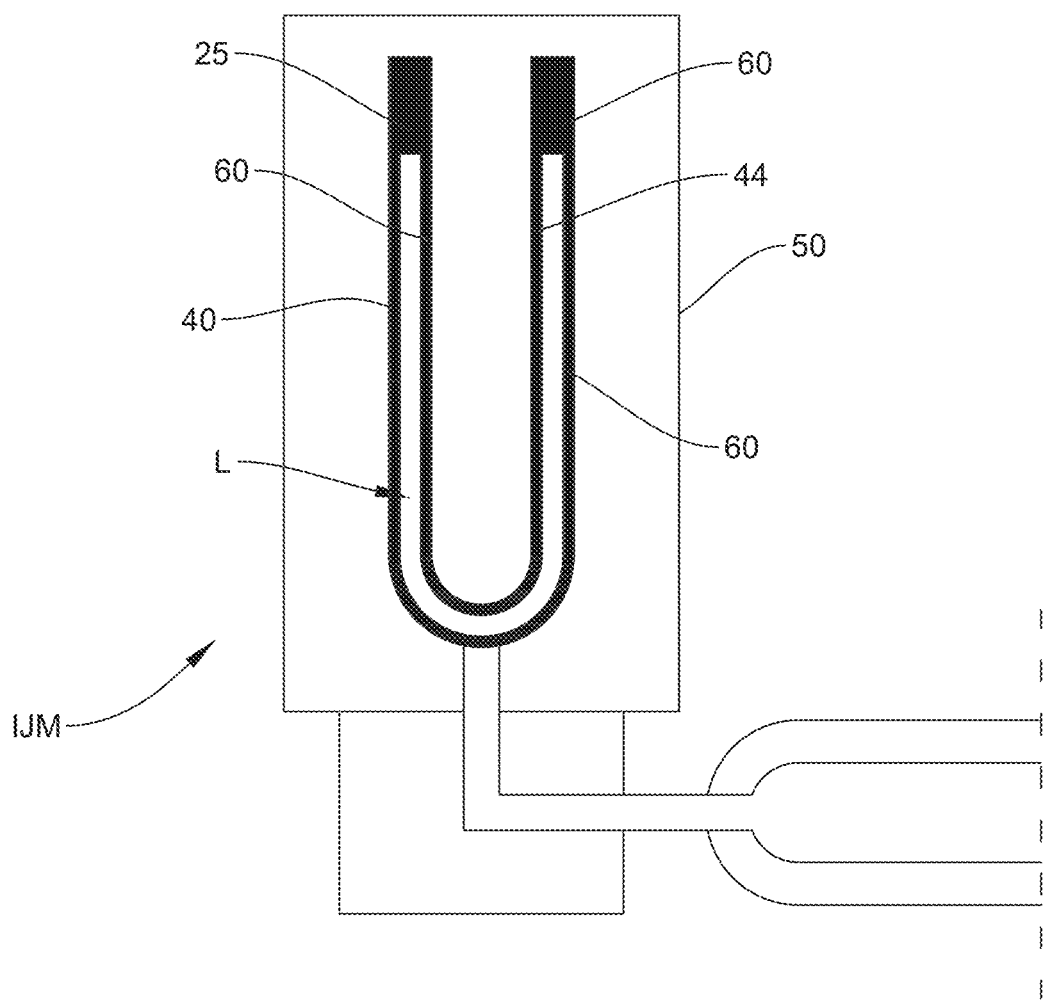
FIG. 4C is a side, cross-sectional view of the component shown in FIG. 4A.
Figure 4D:
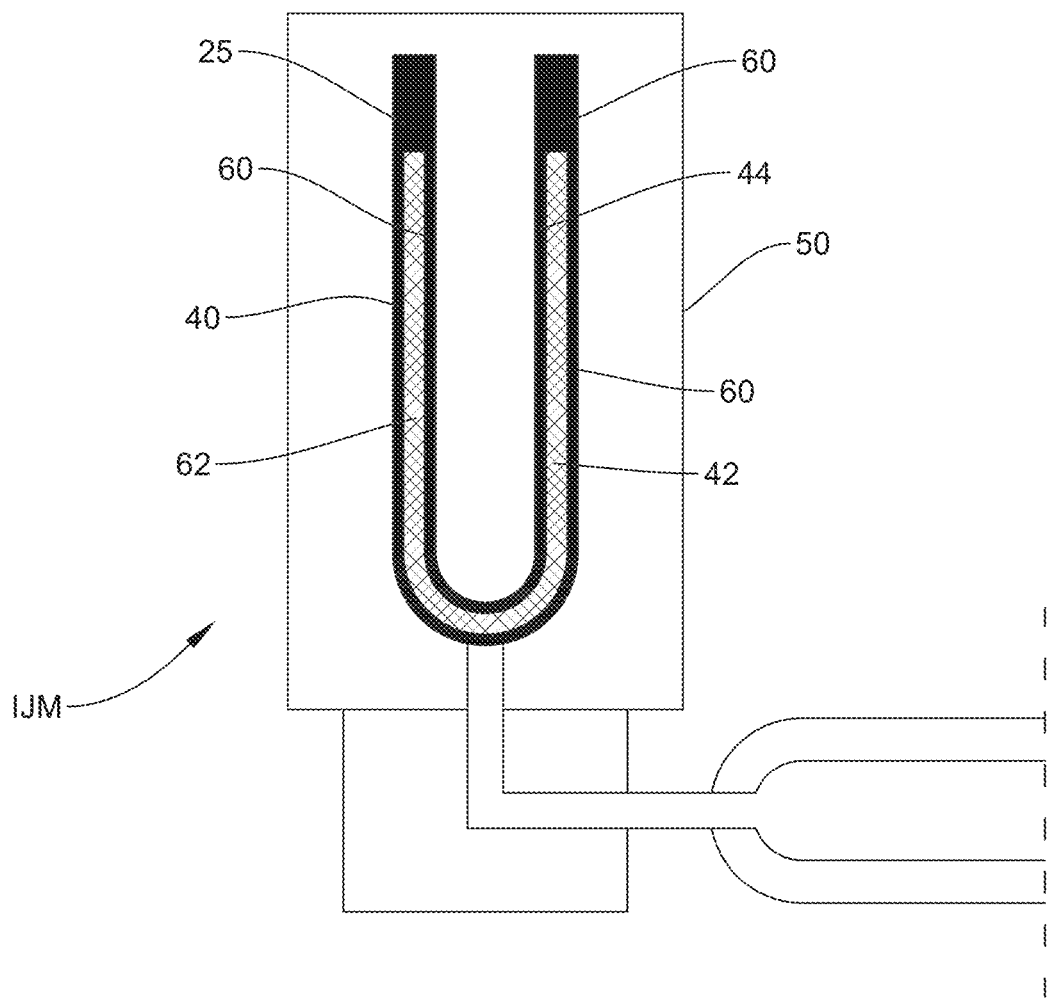
FIG. 4D is a side, cross-sectional view of the component shown in FIG. 4A.
Figure 5:
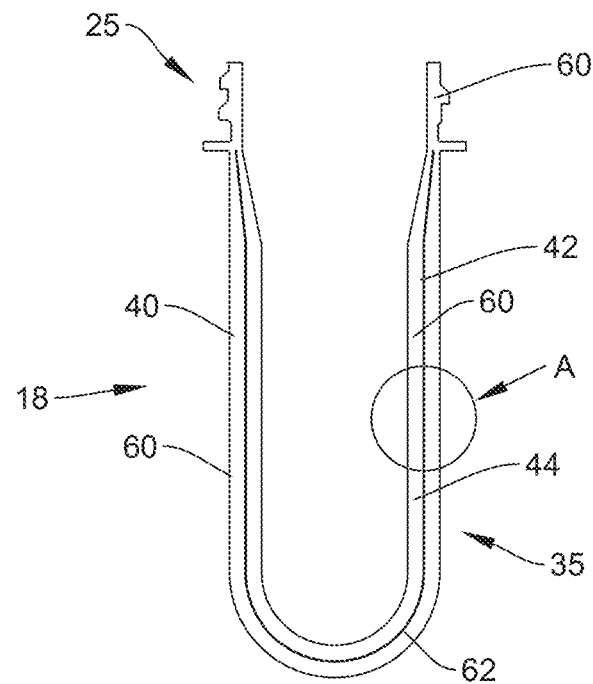
FIG. 5 is a side, cross-sectional view of a component of one embodiment of a container system in accordance with the principles of the present disclosure.

In some embodiments, mold 50 includes an inner surface 52 defining a cavity 54. A block 56 is positioned in cavity 54, as shown in FIG. 4A. First material 60 is injected into cavity 54 by a first extruder of injection molding machine IJM such that first material 60 fills a space between inner surface 52 and outer surface 58 at a top portion of mold 50 to form top portion 25, as shown in FIG. 4B. First material 60 is injected into cavity 54 by the first extruder such that first material 60 accumulates along inner surface 52 to form outer portion 40 and accumulates along outer surface 58 to form inner portion 44. At this point, preform 18 includes a liquid L between outer portion 40 and inner portion 44, as shown in FIG. 4C. Second material 62 is injected into cavity 54 by a second extruder of injection molding machine IJM such that second material 62 replaces liquid L to form intermediate portion 42, as shown in FIG. 4D. In some embodiments, back pressure from the first extruder drives second material 62 away from top section 25 and toward the bottom of preform 18. In some embodiments, the position of intermediate portion 42 relative to outer portion 40 and inner portion 44 can be selected by varying the actual injection timing of the second extruder, varying the velocity that the second extruder injects second material 62 into mold 50 and/or varying the temperature and/or viscosity of first material 60 and/or second material 62.

In some embodiments, the first extruder injects first material 60 into mold 50 continuously until preform 18 is fully formed. That is, the first extruder does not stop injecting first material 60 after top portion 25 is formed.

Rather, the first extruder continues to inject first material 60 into mold after top portion 25 is formed. In some embodiments, the second extruder begins to inject second material 62 into mold 50 after the first extruder begins to inject first material 60 into mold 50. In some embodiments, the second extruder injects second material 62 into mold 50 at the same time that the first extruder injects first material 60 into mold 50. That is, the second extruder injects second material 62 into mold 50 to form portion 42 simultaneously as the first extruder injects first material 60 into mold 50 to form portions 40, 44.

In some embodiments, the single section of top portion 25 consists of one material, such as, for example, first material 60. In some embodiments, portions 40, 44 each comprise the same material that forms the single portion of top portion 25 and at least one additive, such as, for example, one or more of the additives discussed herein. In some embodiments, portions 40, 44 each consist of PET or virgin PET and portion 42 consists of PET or virgin PET and one or more of the additives discussed herein. In some embodiments, the single portion of top portion 25 is free of any additives, such as, for example, the additives discussed herein. In some embodiments, portion 40 is free of any additives, such as, for example, the additives discussed herein. In some embodiments, portion 42 of preform 18 consists of the at least one additive. That is, portion 42 of preform 18 includes only the at least one additive. In some embodiments, portion 42 of preform 18 includes the at least one additive and at least one other material, such as, for example, PET. In some embodiments, the additive(s) is/are concentrated. In some embodiments, the additive(s) is/are concentrated by removing water and/or any diluents from the additive(s).

In some embodiments, portion 42 of preform 18 comprises between 1% and 20% or at least about 20% of a wall thickness of preform 18, wherein the wall thickness of preform 18 is defined by the combined thicknesses of portions 40, 42, 44 of preform 18. In some embodiments, portion 42 of preform 18 comprises between 1% and 5% of the wall thickness of preform 18. In some embodiments, portion 42 of preform 18 comprises between 5% and 10% of the wall thickness of preform 18. In some embodiments, portion 42 of preform 18 comprises between 10% and 15% of the wall thickness of preform 18. In some embodiments, portion 42 of preform 18 comprises between 15% and 20% of the wall thickness of preform 18. In some embodiments, portion 42 of preform 18 comprises between 20% and 25% of the wall thickness of preform 18. In some embodiments, portion 42 of preform 18 comprises between 25% and 30% of the wall thickness of preform 18. In some embodiments, portion 42 of preform 18 comprises between 30% and 35% of the wall thickness of preform 18. In some embodiments, portion 42 of preform 18 comprises greater than 35% of the wall thickness of preform 18.

In some embodiments, portion 42 is positioned equidistant between an inner surface 44a of portion 44 and an outer surface 40a of portion 40, as shown in FIG. 1. In some embodiments, portion 42 is positioned closer to outer surface 40a of portion 40 than inner surface 44a of portion 44.

Figure 6:
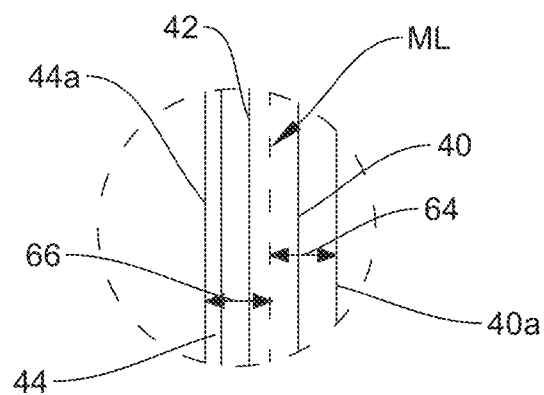
FIG. 6 is an enlarged side, cross-sectional view of the component shown in FIG. 5 at detail A of FIG. 5.
Figure 7:
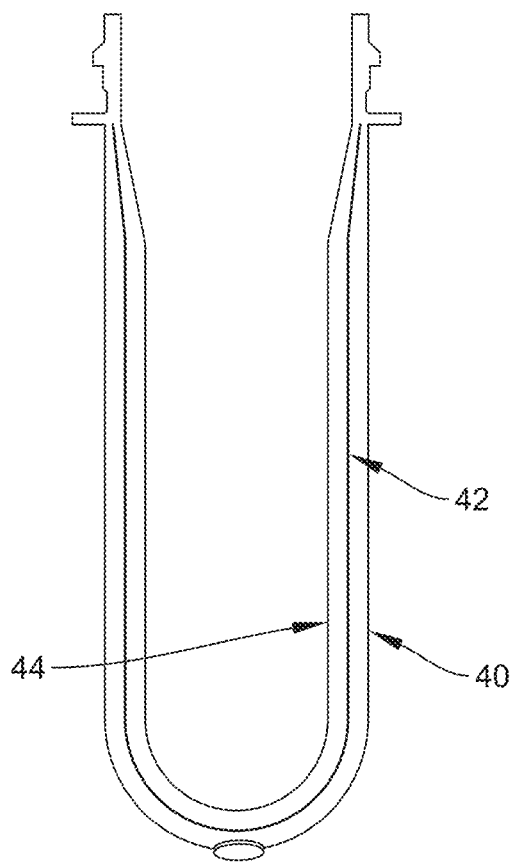
FIG. 7 is a side, cross-sectional view of a component of one embodiment of a container system in accordance with the principles of the present disclosure.
Figure 8:
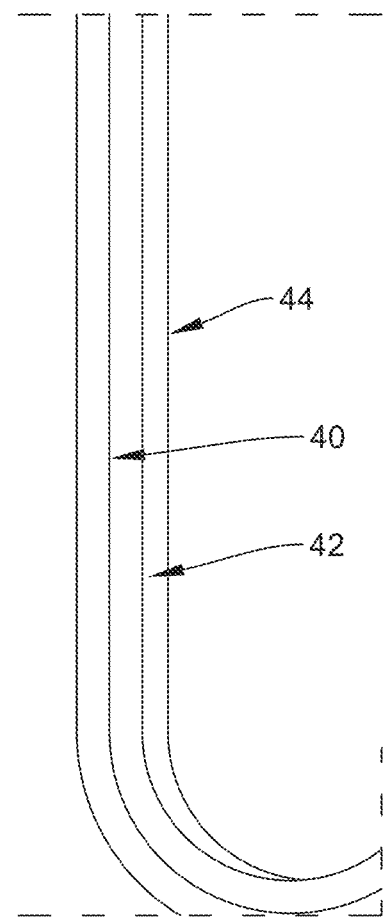
FIG. 8 is a side, cross-sectional view of the component shown in FIG. 7.
Figure 9:
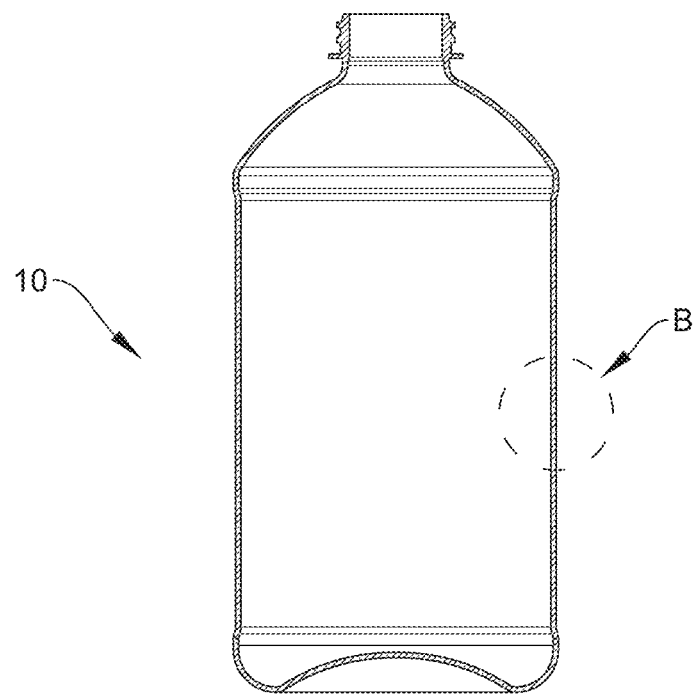
FIG. 9 is a side, cross-sectional view of a component of one embodiment of a container system in accordance with the principles of the present disclosure.

In some embodiments, portion 42 is positioned closer to inner surface 44a of portion 44 than outer surface 40a of portion 40, as shown in FIGS. 5-8. For example, the wall thickness of preform 18 includes a midline ML equidistant between outer surface 40a and inner surface 44a, as shown in FIG. 6. Preform 18 includes a first portion 64 extending from outer surface 40a to midline ML and a second portion 66 extending from inner surface 44a to midline ML. Portion 42 is positioned in second portion 66. In some embodiments, portion 42 is positioned solely in second portion 66 such that no part of portion 42 is positioned in first portion 64. It is envisioned that portion 42 may be positioned closer or farther from inner surface 44a, while still being positioned exclusively in second portion 66. In some embodiments, portion 42 is positioned closer to inner surface 44a than midline ML, while still being positioned exclusively in second portion 66. In some embodiments, portion 42 is positioned 5% to 50% closer to inner surface 44a than outer surface 40a. In some embodiments, portion 42 is positioned 5% to 40% closer to inner surface 44a than outer surface 40a. In some embodiments, portion 42 is positioned 5% to 35% closer to inner surface 44a than outer surface 40a. In some embodiments, portion 42 is positioned 10% to 30% closer to inner surface 44a than outer surface 40a.

In some embodiments, portion 40 has a thickness that is greater than a thickness of portion 44 due to the inward biasing of portion 42. In some embodiments, the thickness of portion 40 is equal to the combined thickness of portions 40, 42. In some embodiments, the thickness of portion 40 greater than the combined thickness of portions 40, 42. In some embodiments, the thickness of portion 40 less than the combined thickness of portions 40, 42.

It is envisioned that the inward biasing of portion 42 and/or concentrating the additive and/or barrier material allows container 10 to be manufactured using less additive or barrier material versus containers with centrally positioned barrier portions and/or containers without concentrated additives and/or barrier materials, without compromising the shelf life of container 10 or the shelf life of a product within container 10. That is, the shelf life of container 10 will be the same or longer than the shelf life of a container with a centrally positioned barrier portion and/or a container without concentrated additives or barrier materials. As discussed above, material 62 forms a barrier a barrier layer. In that material 62 is concentrated, the barrier layer formed by concentrated material 62 is denser than a barrier layer formed by an unconcentrated material 62.

As discussed above, the increased density of the barrier layer formed by material 62 allows an additive, such as, for example, an oxygen scavenger, to act simultaneously as an active oxygen scavenger and a passive oxygen scavenger. For example, the oxygen scavenger will act as an active oxygen scavenger based on its chemical characteristics. The density of the barrier layer formed by concentrated material 62 is high enough to act as a physical barrier that prevents oxygen from moving through/across the barrier layer.

In some embodiments, the inward biasing of portion 42 is accomplished by injecting first material 60 into mold 50 via the first extruder while simultaneously injecting second material 62 into mold 50 via the second extruder. A gate pin in a nozzle housing of mold 50 is offset to create an unequal flow of first material 60 from the first extruder. In some embodiments, offsetting the gate pin directs more of first material 60 toward inner surface 52 than outer surface 58. As such, more of first material 60 will accumulate along inner surface 52 than outer surface 58 such that portion 40 is thicker than portion 44. For example, portion 40 can make up the entirety of portion 64, while portion 44 makes up only a part of portion 66. In some embodiments, offsetting the gate pin causes the flow of second material 62 from the second extruder to move into to a side of cavity 54 that has lower pressure. The position of the second extruder is monitored and adjusted via servo controls, if necessary.

In some embodiments, preform 18 does not include a sprue when preform 18 is introduced into a cavity 20 of mold assembly 22. It is envisioned that preform 18 may be formed without using a sprue or that preform 18 may be formed using a sprue, wherein the sprue is severed or otherwise removed from preform 18 prior disposing preform 18 in cavity 20. As such, portion 42 is maintained between portions 40 and 44 such that no portion of portion 40 extends through portion 40 or portion 44 when preform 18 is positioned within cavity 20, as described herein. In this configuration, portion 40 defines the outermost surface of bottom portion 35 along the entire length of bottom portion 35. Furthermore, bottom portion 35 has an arcuate portion between the sidewalls, wherein the arcuate portion is continuously curved between the sidewalls. That is, the arcuate portion is continuously curved from one of the sidewalls to the other one of the sidewalls when preform 18 is positioned within cavity 20, as described herein. In some embodiments, the arcuate portion has a continuous radius of curvature from one of the sidewalls to the other one of the sidewalls when preform 18 is positioned within cavity 20, as described herein.

Figure 10:
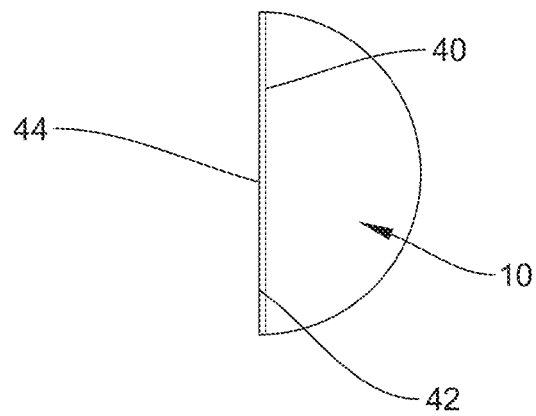
FIG. 10 is an enlarged side, cross-sectional view of the component shown in FIG. 9 at detail B of FIG. 9.

During the molding process, portions 40, 42, 44 are maintained such that portions 40, 42, 44 are also present in finished container 10, as shown in FIGS. 10 and 11. It has been found that the configuration of portions 40, 42, 44 discussed above makes the one or more concentrated additives in portion 42 function more effectively that if the one or more additives were dispersed in each of portions 40, 42, 44. For example, when the one or more concentrated additive in portion 42 is an oxygen scavenger, such as, for example, one or more of the oxygen scavengers discussed herein, the concentrated oxygen scavenger decreases the level of oxygen in container 10 more effectively than if the oxygen scavenger was also included in portions 40, 44. This will prevent or reduce the amount of oxygen that will be able to enter the inside of container 10, hence extending the shelf life of any food and/or beverage product within container 10. Indeed, the configuration of portions 40, 42, 44 discussed above allows portion 42 to form a barrier that prevents or reduces the ability of oxygen to move from the environment surrounding container 10 to the inside 15 of container 10.

In some embodiments, portion 42 of container 10 consists of the at least one concentrated additive. That is, portion 42 of container 10 includes only the at least one concentrated additive. In some embodiments, portion 42 of container 10 includes the at least one concentrated additive and at least one other material, such as, for example, PET. In some embodiments, portion 42 of container 10 comprises less than 5% of a wall thickness of container 10, wherein the wall thickness of container 10 is defined by the combined thicknesses of portion 40, portion 42 and portion 44 of container 10. In some embodiments, portion 42 of container 10 comprises less than 10% of the wall thickness of container 10. In some embodiments, portion 42 of container 10 comprises less than 15% of the wall thickness of container 10. In some embodiments, portion 42 of container 10 comprises less than 20% of the wall thickness of container 10. In some embodiments, portion 42 of container 10 comprises less than 25% of the wall thickness of container 10. In some embodiments, portion 42 of container 10 comprises less than 30% of the wall thickness of container 10.

In some embodiments, the single portion of top portion 25 has the same thickness in container 10 as the combined thickness of portions 40, 42, 44. In some embodiments, portions 40, 42, 44 each have the same thickness in container 10. In some embodiments, at least one of portions 40, 42, 44 in container 10 has a thickness that is greater than a thickness of another one of portions 40, 42, 44 in container 10. In some embodiments, at least one of portions 40, 42, 44 in container 10 has a thickness that is less than a thickness of another one of portions 40, 42, 44 in container 10. In some embodiments, portions 40, 44 each have the same thickness in container 10 and portion 42 has a thickness in container 10 that is different than the thicknesses of portions 40, 44. In some embodiments, portions 40, 44 each have the same thickness in container 10 and portion 42 has a thickness in container 10 that is greater than the thicknesses of portions 40, 44 in container 10. In some embodiments, portions 40, 44 each have the same thickness in container 10 and portion 42 has a thickness that is less than the thicknesses of portions 40, 44 in container 10.

In some embodiments, the two-stage method includes one or more steps in a second stage of the manufacturing operation. For example, in a step S3 of the second stage, preform 18 is provided having a dome forming surface 30, thread forming surface 24 and a body forming surface 32. In some embodiments, the second stage includes a step S4, which comprises pre-heating preform 18 to a temperature in a range of about 95 degrees Celsius (C) to about 110 degrees C. In some embodiments, dome forming surface 30 is formed solely from a material, such as, for example, PET or virgin PET. In some embodiments, dome forming surface 30 is free of any additives, such as, for example, the additives discussed herein. In some embodiments, dome forming surface 30 includes a single portion is formed solely from a material, such as, for example, PET or virgin PET. That is, thread forming surface 24 is free any additives, such as, for example, the additives discussed herein. In some embodiments, thread forming surface 24 includes portions, such as, for example, portions 40, 42, 44 and is formed from a material, such as, for example, PET or virgin PET, and one or more concentrated additive, such as, for example, one or more of the additives discussed herein. In some embodiments, body forming surface 32 includes portions, such as, for example, portions 40, 42, 44 and is formed from a material, such as, for example, PET or virgin PET, and one or more concentrated additive, such as, for example, one or more of the additives discussed herein. In some embodiments, the portion of preform 18 that includes the concentrated additives (the portion that includes portions 40, 42, 44) terminates below a trim point TP, as discussed herein, and that the portion of above the trim point includes a single portion that is free of any additives, such as, for example, the additives discussed herein.

In some embodiments, the second stage includes a step S5, which comprises mounting pre-heated preform 18 in place within cavity 20 of mold assembly 22. Mold assembly 22 has an interior mold surface shaped to correspond to the selected configuration of container 10. As discussed above, the interior mold surface can be shaped such that container 10 has any size and/or shape, depending upon the application. In some embodiments, the temperature of mold assembly 22 is in a range of about 40 degrees Fahrenheit (F) to about 110 degrees F. Preform 18 has a flange 34, which mounts on mold assembly 22 adjacent opening 28. In some embodiments, preform 18 has surface 30 that forms dome 36 of intermediate article 16, a surface 24 that forms neck 12 of intermediate article 16 and a surface 32 that forms body 38 of intermediate article 16. In some embodiments, preform 18 does not have surface 30 that forms dome 36 and is blow molded to form finished container 10 without dome 36, as discussed herein. That is, preform 18 is configured to not form dome 36 such that no trimming of dome 36 is required to produce finished container 10. In some embodiments, surface 30 has a wall thickness in a range of about 0.100 inches (in) to about 0.300 in. In some embodiments, surface 24 has a wall thickness in a range of about 0.100 in to about 0.300 in. In some embodiments, surface 32 has a wall thickness in a range of about 0.100 in to about 0.300 in.

A step S6 includes blowing air into preform 18 to mold intermediate article 16, as shown in FIG. 4. In some embodiments, air is blown from a compressor and at a pressure in a range of about 35 to about 40 bar blown into an open end 40 of preform 18 to stretch or extend surfaces 30, 24, 32 and a bottom surface 42 of preform 18 radially outwardly and axially downwardly against the interior molding surface of mold assembly 22, as shown in FIG. 3. A step S7 includes removing intermediate article 16 from mold assembly 22. In some embodiments, preform 18 has a diameter of about 3.3 inches adjacent surface 24 and a length of about 6.2 inches; and intermediate article 16 has a diameter of about 6 inches and a length of about 10.3 inches. In some embodiments, finished container 10, after trimming of intermediate article 16 as described herein, has a maximum diameter of about 7.25 inches.

In some embodiments, dome 36 is attached to an upper edge of neck 12 along an annular recess 44. In some embodiments, the second stage includes a step S8, which comprises removing and/or trimming off dome 36 from intermediate article 16 adjacent neck 12 with a trimming machine TM. Dome 36 is severed from intermediate article 16 to produce finished container 10, as shown in FIG. 3. As such, the second stage includes a step S9 of providing finished container 10.

As discussed above, the portion of preform 18 that includes the concentrated additives (the portion that includes portions 40, 42, 44) terminates below the trim point and that the portion of above trim point TP includes a single portion that is free of any additives, such as, for example, the additives discussed herein. In that dome 36 is formed from the single portion of top portion 25 of preform that does not include any additives, dome 36 is free of any of the additives discussed above. In some embodiments, dome 36 is scrap material (post-industrial material) that may be reused in another manufacturing process, such as, for example, the manufacturing of another container, such as, for example, another container that is the same or similar to container 10.

Dome 36 may be ground, blended, dried and added to a melt stream to produce a second preform. In some embodiments the melt stream includes virgin PET without any other additives. In some embodiments the melt stream includes PET in addition to one or more of the additives discussed above. In some embodiments the melt stream includes virgin PET without any other additives and one or more of the additives discussed above is added to the melt stream after ground, blended and dried dome 36 is added to the melt stream. The second preform is disposed in a mold, similar to step S3 discussed above. The second preform may then be pre-heated, similar to step S4 discussed above. In some embodiments, the preheated second preform is mounted in place within a cavity of a mold, such as, for example, cavity 20 of mold assembly 22, similar to step S5 discussed above. In some embodiments, the second preform is air blown to mold a second intermediate article similar to intermediate article 16, similar to step S6 discussed above. The second intermediate article is removed from the mold assembly, similar to step S7 discussed above. In some embodiments, a dome of the second intermediate article, similar to dome 36, is removed and/or trimmed off from the second intermediate article adjacent a neck of the second intermediate article that is similar to neck 12 with a trimming machine, such as, for example trimming machine TM. The dome of the second intermediate article is severed from the second intermediate article to produce a second finished container that is similar to finished container 10.

In some embodiments, wherein finished container 10 is produced without any trimming step, step S6 includes blowing air into preform 18 to form finished container 10 and step S7 includes removing finished container 10 from mold assembly 22. In such embodiments, steps S8 and S9 are excluded.

In some embodiments, container 10 comprises PET and the method of making container 10 discussed above may be modified to, for example, vary the crystallinity of PET. In some embodiments, the method is configured to prevent crystallization such that the PET is amorphous. Such embodiments may be used in applications where it is desired that container 10 be clear and/or container 10 is not expected to encounter elevated temperatures or aggressive chemical environments. In some embodiments, the temperature that preform 18 is exposed to during the molding process may be limited such that the temperature does not exceed a selected threshold temperature to produce container 10 wherein the PET is amorphous. In some embodiments, the selected threshold temperature is above the glass-transition temperature of PET, but below the crystallization temperature of PET.

In some embodiments, the temperature that preform 18 is exposed to during the molding process may be required to exceed a selected threshold temperature wherein the PET is not quenched rapidly to produce container 10 wherein the PET is semi-crystalline or crystalline. In some embodiments, the selected threshold temperature is above the crystallization temperature of PET. In some embodiments, the selected threshold temperature is below the melting temperature of PET. In some embodiments, the amount of time preform 18 is exposed to the selected temperature may be varied to achieve the desired amount of crystallinity. In some embodiments, preform 18 is stretched in place of or in addition to heating preform 18 during the molding process to exceed the selected temperature. In some embodiments, the PET used has a narrow molecular weight, linear polymer chain structure, and high molecular weight to make the PET semi-crystalline or crystalline. In some embodiments, nucleating agents are added to produce container 10 wherein the PET is semi-crystalline or crystalline. In some embodiments, the nucleating agents include, for example, talc, sodium benzoate and an ionomer. In some embodiments, pressure may be applied during the molding process to produce container 10 wherein the PET is semi-crystalline or crystalline. In some embodiments, moisture may be added to preform 18 during the molding process to produce container 10 wherein the PET is semi-crystalline or crystalline.

In some embodiments, the method is adapted in one or more of the ways discussed above to produce a container that has a crystallinity between about 5% and about 40%. In some embodiments, the method is adapted in one or more of the ways discussed above to produce a container that has a crystallinity of about 10%. In some embodiments, the method is adapted in one or more of the ways discussed above to produce a container that has a crystallinity between about 15% and about 20%. In some embodiments, the method is adapted in one or more of the ways discussed above to produce a container that has a crystallinity between about 20% and about 25%. In some embodiments, the method is adapted in one or more of the ways discussed above to produce a container that has a crystallinity between about 18% and about 30%. In some embodiments, the method is adapted in one or more of the ways discussed above to produce a container that has a crystallinity between about 20% and about 40%. In some embodiments, the crystallinity of container 10 may be modified such that container 10 comprises portions that contain strength hardened PET with the characteristics discussed above.

It has been described where severed dome 36 is processed into material 60. It is envisioned that other post-industrial material (that includes certain amounts of additives and/or oxygen scavengers) may be processed for use as material 60 in the same manner that dome is processed into material. It is further envisioned that certain other post-industrial material (e.g., body 38 of intermediate article 16) and/or certain post-consumer material (e.g., recycled containers) can be processed into material 60. However, steps may be required to ensure that the other post-industrial material and/or post-consumer material (that includes certain amounts of additives and/or oxygen scavengers) has characteristics that are close to virgin PET. Indeed, while PET has many favorable characteristics, it is relative expensive. As such, container manufactures will only pay the increased cost of PET when such PET has the characteristics of virgin PET or characteristics close to those of virgin PET. If the characteristics of the PET (e.g., b* measurement and/or haze percentage) deviate too far from the characteristics of virgin PET (due to the amount of additives and/or oxygen scavengers in the PET), such PET is often determined to be unsuitable for use in PET containers.

The Association of Plastic Recyclers (APR) has provided a standard to determine the suitability of post-consumer PET for reuse in PET containers that is followed by all U.S. plastic container manufacturers. Indeed, APR is the trade group that has been recognized as the authority on plastics recycling. APR has several testing protocols to establish a packages potential impact on the recycling stream and the cleaning systems used by reclaimer's. One of those testing protocols is the (CGR) Critical Guidance Recognition Protocol. The CGR uses a standard bottle and resin as the base line for data collection throughout the protocol. A test container is put through the same physical and chemical tests at the same time as the standard container. Then the two samples are measured for specific properties and the test container is only allowed to deviate from the standard container by a predetermined amount.

In one embodiment, the control container and/or the material such as bottle 10 may be compared by using an APR protocol that involves grinding a control PET bottle into flakes and extruding the flakes into pellets. A separate sample of the container such as bottle 10 is ground into the same size flakes on the same equipment and extruded into pellets. Both samples are measured for color and consistency. Both samples are melted and formed into plaques. Both plaque samples are tested for color and haze. Both plaque samples are ground into flakes and extruded into pellets again. Both pellet samples are tested for color and consistency. Both pellet samples are melted and formed into plaque. Both plaque samples are tested for color and haze. Both plaque samples are ground into flakes and extruded into pellets again. Both pellet samples are tested for color and consistency. The two pellet samples are then split. The pellet samples from the standard PET bottle and the pellet samples from the container such as bottle 10 are made into plaques and tested for color and haze. The other pellet sample from the standard PET bottle and the other pellet sample from the from the container such as bottle 10 are heated and tested for IV (intrinsic viscosity) build over a set period of time at specific temperatures.

Solid State Polymerization (SSP) is a common commercial practice to build the molecular weight of PET. For this data the pellets were exposed to heat and vacuum employing a laboratory scale rotary vacuum unit. The methodology used by the lab involved was the APR (Association of Plastic Recyclers) Solid State Polymerization of PET Pellets, PET-P-07 test method.

As discussed above, the b* measurement is one measurement used by the APR to determine the suitability of post-consumer containers for reuse in PET containers. The b* measurement is the yellow to blue vector of a three vector color graph. The yellow tone or color is typically used to indicate the degree of degradation of PET after processing and subsequent heat cycles. The more yellow the PET is, it is assumed that it is more degraded. And PET will degrade with each heat history that it is subjected to. So with each heat history the control or standard PET bottle is put through it will increase in yellow b* measurement. The APR Critical Guidance Recognition testing recognizes this and established a range that the bottle has to stay within. The Container must be +/−1.5 b* unit from the control bottle plaques to pass the test. If the container is outside of this limit on b* measurement, it fails the test and does not meet the APR Critical Guidance Recognition Requirements for reuse in PET containers.

Figure 12:
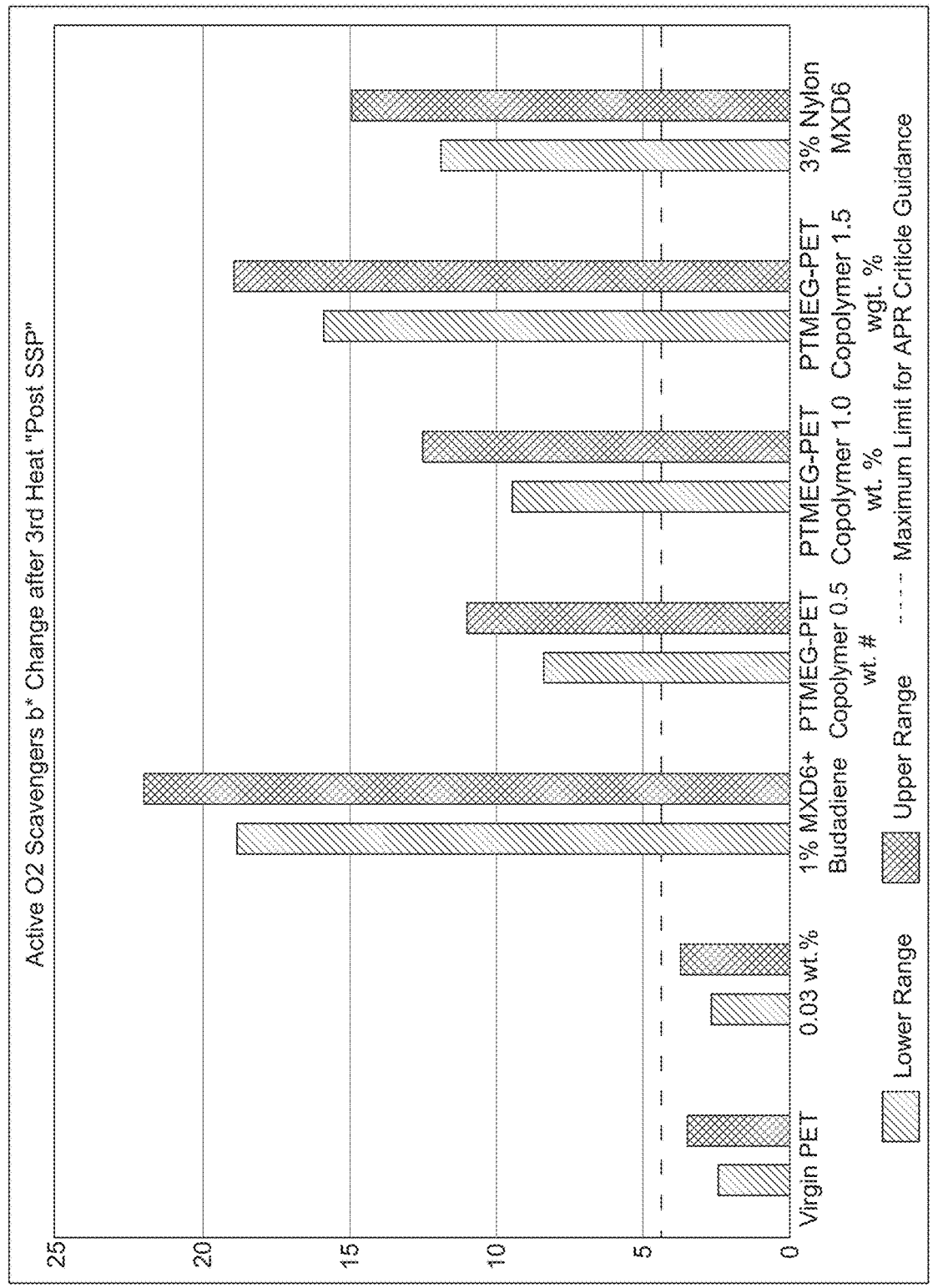
FIG. 12 is a graph comparing the b* measurement of several containers with the b* measurement of virgin PET.
Figure 12A:
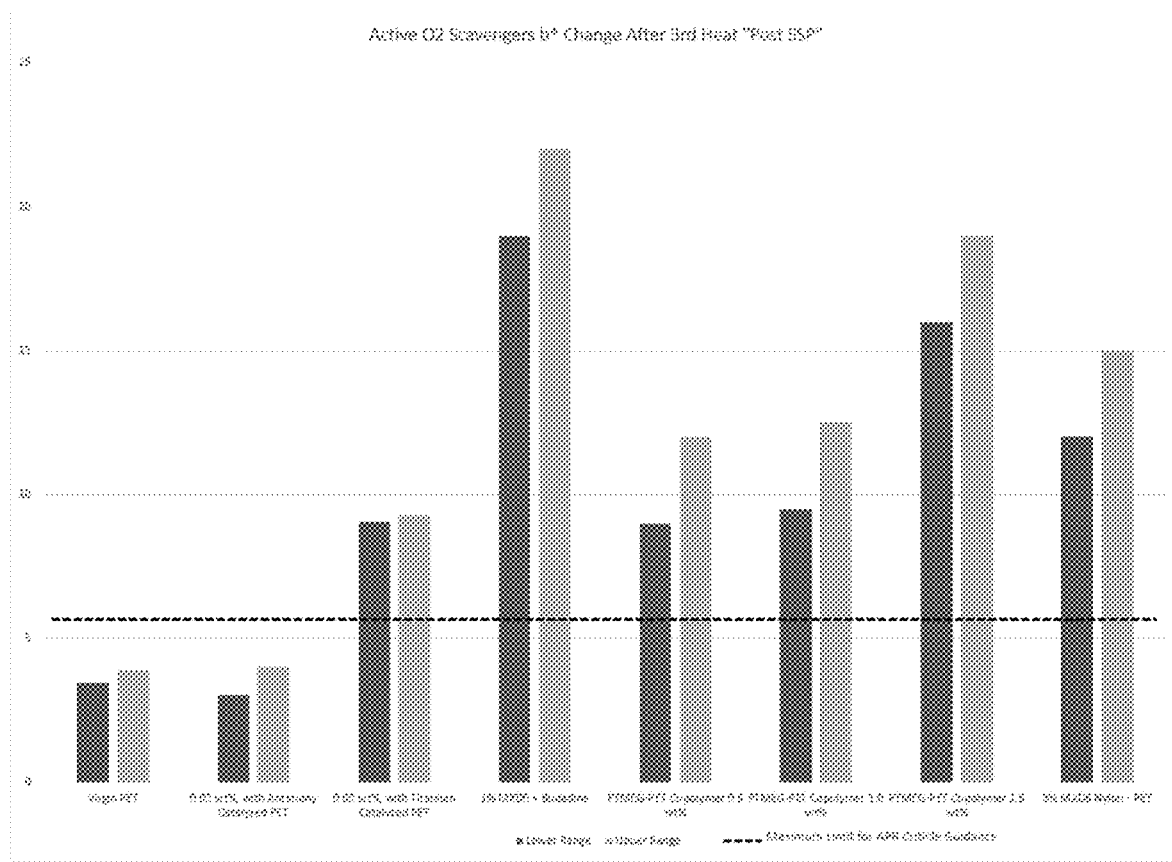
FIG. 12A is a graph comparing the b* measurement of several containers with the b* measurement of virgin PET.

The *b measurements of a container 10 (wherein container 10 includes 0.03 wt % of the oxygen scavenger, as discussed herein) and several other containers have been compared with the *b measurements of virgin PET using the APR protocol discussed above to determine the suitability of the containers for reuse in PET containers. As shown in FIG. 12 container 10 has the closest b* to virgin PET of all of the samples that have been through the SSP test. That is, the containers that include greater percentages of scavenger (e.g., Active Scavengers A-E) deviate from the b* measurement of virgin PET more so than container 10, which contains much less scavenger than conventional containers, such as, for example, Active Scavengers A-E. Notably, samples having a b* measurement of more than 5 (e.g., Active Scavengers A-E) exhibit a significant degree of yellowing that makes them unsuitable to make PET containers. Active Scavengers A-E would hence be unsuitable for use as material 60. In that container 10 behaves similar to virgin PET and has a b* measurement of less than 5, container 10 would be suitable for use as material 60. As such, the relatively low amount of oxygen scavenger and/or other additives in container 10 makes container 10 suitable for reuse in PET containers, while other containers that include higher amounts of oxygen scavenger and/or other additives are not suitable for reuse in PET containers. It is noted that in the comparison discussed in this paragraph, the "Virgin PET" range maximum is 3.5 b* units, so the maximum b* limit (dashed line) was set at 5 b* units. The minimum is not relevant to this group and hence is not represented. Container 10 was tested in accordance with the methods discussed herein to determine whether or not additives in first material 60 would effect the b* measurement of container 10. As shown in FIG. 12A, container 10 behaves similar to virgin PET and has a b* measurement of less than 5 when first material 60 includes an antimony catalyst.

Figure 13:
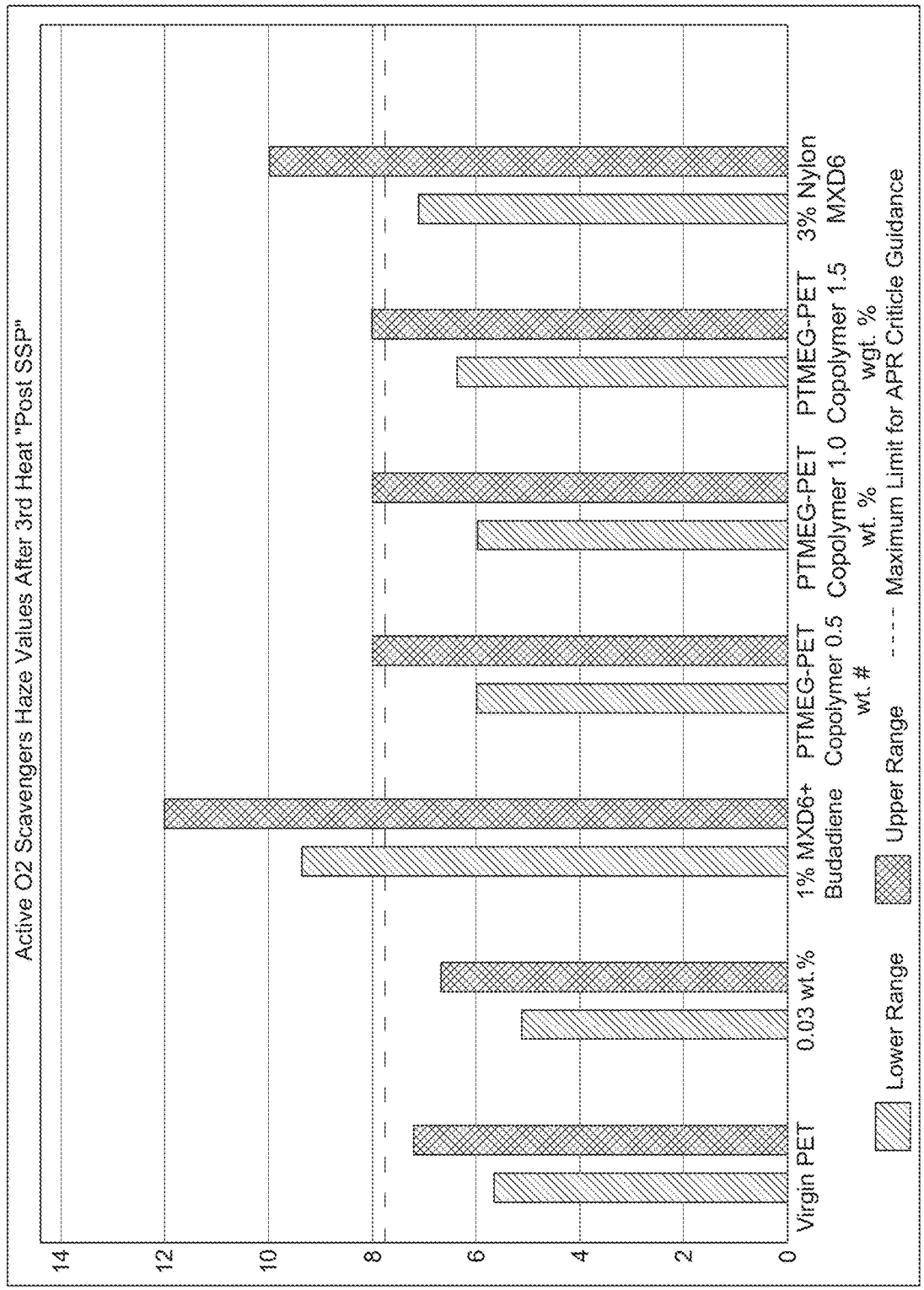
FIG. 13 is a graph comparing the haze percentage of several containers with the haze percentage of virgin PET.

The haze percentage of a container 10 and the other containers discussed in connection with FIG. 12 have been compared with the haze percentage of virgin PET using the APR protocol discussed above to determine the suitability of the containers for reuse in PET containers. The control bottle plaques ("Virgin PET") has to measure less than 9% haze value to be acceptable. Then once that is established, plaque samples of the containers that are being compared with the control bottle plaques have to be with 10% of the measurement of the control bottle plaques. So the highest haze value of the represented control was 7.0 and 10% of that is 0.7, which is indicated in FIG. 13 by dashed line to show the maximum haze percentage for each sample. As shown in FIG. 13, the haze percentage of container 10 is below 7 and is hence reusable in PET containers. The other samples, however, have haze percentages above 7 and are hence does not meet the APR Critical Guidance Recognition Requirements for reuse in PET containers. Again, the relatively low amount of oxygen scavenger and/or other additives in container 10 makes container 10 suitable for reuse in PET containers, while other containers that include higher amounts of oxygen scavenger and/or other additives are not suitable for reuse in PET containers.

Figure 14:
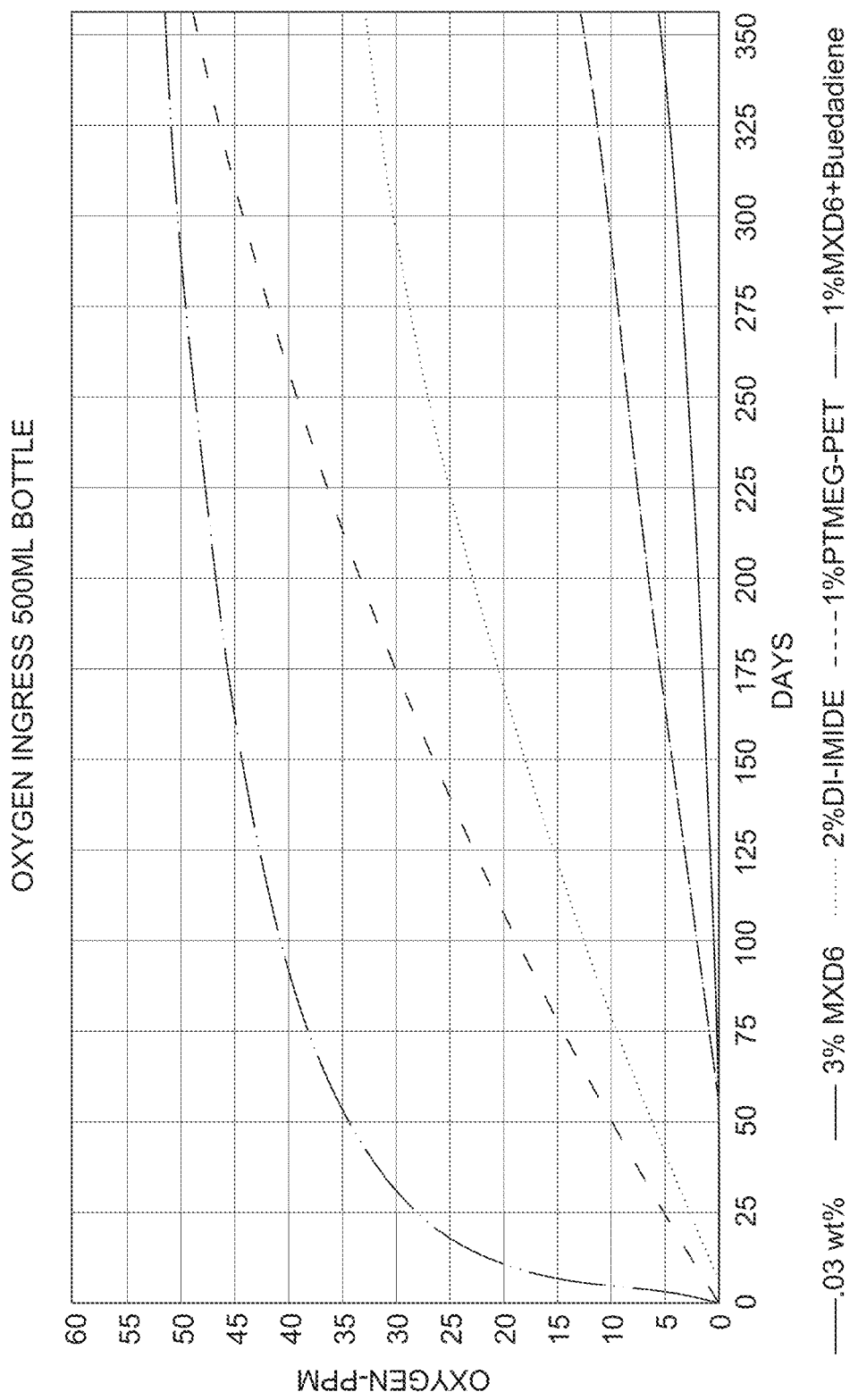
FIG. 14 is a graph showing oxygen ingress in a 500 mL bottle over a period of 365 days.

One way to measure the effectiveness and strength of O2 scavengers is fill containers with deoxygenated water, seal the containers and measure the O2 in the water over time. The O2 level in the water increases as O2 permeates through the container (walls, seals, caps, etc. . . . ) and the increase in O2 levels measured in PPM (parts per million) over time. The chart in FIG. 14 shows four alternative active scavengers to the 0.03 wt. % active scavenger referenced in this document. The number of days the containers are in the test is the X axis and the resulting O2 levels measured inside of the sealed containers is the Y axis. The solid line indicates the performance of the 0.03 wt. % container.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for manufacturing a container, the method comprising:
   injecting a first material into a first mold to form a top portion of a preform, the first material comprising polyethylene terephthalate that is made with a metallic catalyst; and
   injecting the first material and a second material into the first mold to form a bottom portion of the preform, the second material comprising a resin, a catalyst and an oxygen scavenger,
   wherein the top portion comprises only the first material and the bottom portion comprises an inner portion, an intermediate portion and an outer portion, the inner portion and the outer portion comprising the first material, the intermediate portion comprising the second material.

2. The method recited in claim 1, wherein the metallic catalyst comprises antimony.

3. The method recited in claim 1, wherein the metallic catalyst comprises antimony trioxide and is present in the first material at a concentration of 150-350 parts per million antimony.

4. The method recited in claim 1, wherein the metallic catalyst comprises antimony trioxide and is present in the first material at a concentration of 250-290 parts per million antimony.

5. The method recited in claim 1, wherein the metallic catalyst comprises antimony triacetate and is present in the first material at a concentration of 150-350 parts per million antimony.

6. The method recited in claim 1, wherein the metallic catalyst comprises antimony triacetate and is present in the first material at a concentration of 250-290 parts per million antimony.

7. The method recited in claim 1, wherein the metallic catalyst comprises germanium.

8. The method recited in claim 1, wherein the metallic catalyst comprises germanium dioxide and is present in the first material at a concentration of 50-150 parts per million germanium.

9. The method recited in claim 1, wherein the metallic catalyst comprises germanium dioxide and is present in the first material at a concentration of 50-85 parts per million germanium.

10. The method recited in claim 1, wherein the metallic catalyst comprises a combination of antimony and germanium.

11. The method recited in claim 1, wherein the metallic catalyst comprises aluminum.

12. The method recited in claim 1, wherein the metallic catalyst comprises aluminum alkoxides.

13. The method recited in claim 1, wherein the first material comprises a phosphorous stabilizer at a concentration of 5-30 parts per million phosphorous.

14. The method recited in claim 13, wherein the phosphorous stabilizer is phosphoric acid.

15. The method recited in claim 1, wherein the resin comprises a polyester copolymer resin.

16. The method recited in claim 1, wherein the catalyst comprises a cobalt catalyst.

17. The method recited in claim 1, wherein the oxygen scavenger comprises an oxidizable co-polyester barrier.

18. The method recited in claim 1, wherein the first material is free of titanium.

19. The method recited in claim 1, wherein the container has a b* unit value that is less than 5.

20. The method recited in claim 1, wherein the container has a b* unit value that is +/−1.5 of a b* unit value from a control bottle.

21. The method recited in claim 20, wherein the control bottle consists of virgin polyethylene terephthalate.

22. The method recited in claim 1, wherein the container has a haze percentage that is below 7.

23. The method recited in claim 1, wherein the container has a haze percentage that is within 10% of a haze percentage of a control bottle.

24. The method recited in claim 23, wherein the control bottle consists of virgin polyethylene terephthalate.

25. A method for manufacturing a container, the method comprising:
   injecting a first material into a first mold to form a top portion of a preform, the first material comprising a phosphorous stabilizer and polyethylene terephthalate that is made with a metallic catalyst, the metallic catalyst comprising antimony trioxide and being present in the first material at a concentration of 250-290 parts per million antimony, the first material being free of titanium; and
   injecting the first material and a second material into the first mold to form a bottom portion of the preform, the second material comprising a resin, a catalyst and an oxygen scavenger, the resin comprising a polyester copolymer resin, the catalyst comprising a cobalt catalyst, the oxygen scavenger comprising an oxidizable co-polyester barrier,
   wherein the top portion comprises only the first material and the bottom portion comprises an inner portion, an intermediate portion and an outer portion, the inner portion and the outer portion comprising the first material, the intermediate portion comprising the second material.

26. A method for manufacturing a container, the method comprising:
injecting a first material into a first mold to form a top portion of a preform, the first material comprising a phosphorous stabilizer and polyethylene terephthalate that is made with a metallic catalyst, the metallic catalyst comprising antimony triacetate and being present in the first material at a concentration of 150-350 parts per million antimony, the first material being free of titanium; and
injecting the first material and a second material into the first mold to form a bottom portion of the preform, the second material comprising a resin, a catalyst and an oxygen scavenger, the resin comprising a polyester copolymer resin, the catalyst comprising a cobalt catalyst, the oxygen scavenger comprising an oxidizable co-polyester barrier,
wherein the top portion comprises only the first material and the bottom portion comprises an inner portion, an intermediate portion and an outer portion, the inner portion and the outer portion comprising the first material, the intermediate portion comprising the second material.

* * * * *